(12) United States Patent
Taylor et al.

(10) Patent No.: US 9,600,100 B2
(45) Date of Patent: Mar. 21, 2017

(54) INTERACTIVE INPUT SYSTEM AND METHOD

(71) Applicant: SMART Technologies ULC, Calgary (CA)

(72) Inventors: Cameron Taylor, Calgary (CA); Clinton Lam, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 0 days.

(21) Appl. No.: 13/823,638

(22) PCT Filed: Jan. 11, 2013

(86) PCT No.: PCT/CA2013/000024
§ 371 (c)(1),
(2) Date: Mar. 14, 2013

(87) PCT Pub. No.: WO2013/104062
PCT Pub. Date: Jul. 18, 2013

(65) Prior Publication Data
US 2015/0123899 A1    May 7, 2015

Related U.S. Application Data

(60) Provisional application No. 61/585,527, filed on Jan. 11, 2012.

(51) Int. Cl.
*G06F 3/038* (2013.01)
*G06F 3/03* (2006.01)
(Continued)

(52) U.S. Cl.
CPC .......... *G06F 3/0383* (2013.01); *G06F 3/0304* (2013.01); *G06F 3/0425* (2013.01);
(Continued)

(58) Field of Classification Search
CPC .... G06F 3/0488; G06F 3/04883; G06F 3/044; G06F 3/04886; G06F 3/045;
(Continued)

(56) References Cited

U.S. PATENT DOCUMENTS 5,448,263 A   9/1995   Martin
6,141,000 A   10/2000  Martin
(Continued)

FOREIGN PATENT DOCUMENTS

WO    WO 2010/028490    *   3/2010

OTHER PUBLICATIONS

Notification; International Search Report; and the Written Opinion of the International Searching Authority for International Application No. PCT/CA2013/000024 wit a mailing date of Apr. 15, 2013.

*Primary Examiner* — Md Saiful A Siddiqui
(74) *Attorney, Agent, or Firm* — Perkins Coie LLP

(57) ABSTRACT

An interactive input system comprises at least one imaging device configured to capture image frames of a region of interest comprising a background and at least one background feature. Processing structure is configured to compare the image frames to determine if the location of the at least one background feature has changed signifying system displacement.

27 Claims, 20 Drawing Sheets

(51) Int. Cl.
*G06F 3/042* (2006.01)
*G06T 7/00* (2006.01)
*G06F 3/0354* (2013.01)

(52) U.S. Cl.
CPC ............ *G06F 3/0428* (2013.01); *G06T 7/004* (2013.01); *G06T 7/0022* (2013.01); *G06F 3/03545* (2013.01)

(58) Field of Classification Search
CPC .. G06F 3/0383; G06F 3/0425; G06F 3/03545; G06F 3/0304; G06F 3/0428
USPC ................... 345/1.1, 1.3, 156, 169, 173–179
See application file for complete search history.

(56) References Cited

U.S. PATENT DOCUMENTS

| | | | |
|---|---|---|---|
| 6,211,913 B1 * | 4/2001 | Hansen | H04N 5/23248 348/218.1 |
| 6,219,011 B1 | 4/2001 | Aloni et al. | |
| 6,281,878 B1 | 8/2001 | Montellese | |
| 6,337,681 B1 | 1/2002 | Martin | |
| 6,441,362 B1 | 8/2002 | Ogawa et al. | |
| 6,540,366 B2 | 4/2003 | Keenan et al. | |
| 6,567,078 B2 | 5/2003 | Ogawa et al. | |
| 6,747,636 B2 | 6/2004 | Martin | |
| 6,803,906 B1 | 10/2004 | Morrison et al. | |
| 6,972,401 B2 | 12/2005 | Akitt et al. | |
| 7,202,860 B2 | 4/2007 | Ogawa et al. | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,414,617 B2 | 8/2008 | Ogawa et al. | |
| 7,426,297 B2 | 9/2008 | Zhang et al. | |
| 7,432,917 B2 | 10/2008 | Wilson et al. | |
| 7,613,358 B2 | 11/2009 | Wilson | |
| 2004/0179001 A1 | 9/2004 | Morrison et al. | |
| 2005/0088424 A1 * | 4/2005 | Morrison et al. | 345/173 |
| 2009/0277697 A1 | 11/2009 | Bolt et al. | |
| 2009/0278795 A1 | 11/2009 | Hansen et al. | |
| 2010/0045636 A1 | 2/2010 | Noguchi et al. | |
| 2010/0079385 A1 | 4/2010 | Holmgren et al. | |
| 2010/0201812 A1 | 8/2010 | McGibney et al. | |
| 2011/0006981 A1 | 1/2011 | Chtchetinine et al. | |
| 2011/0032230 A1 * | 2/2011 | Sun | G06F 3/0346 345/207 |
| 2011/0169727 A1 | 7/2011 | Akitt et al. | |
| 2011/0169736 A1 | 7/2011 | Bolt et al. | |
| 2011/0170253 A1 | 7/2011 | Liu et al. | |
| 2011/0221706 A1 * | 9/2011 | McGibney et al. | 345/175 |
| 2011/0242006 A1 | 10/2011 | Thompson et al. | |
| 2011/0242060 A1 | 10/2011 | McGibney et al. | |
| 2012/0200538 A1 * | 8/2012 | Christiansson et al. | 345/175 |
| 2012/0250936 A1 | 10/2012 | Holmgren | |

* cited by examiner

INTERACTIVE INPUT SYSTEM AND METHOD

FIELD OF THE INVENTION

The present invention relates to an interactive input system and method.

BACKGROUND OF THE INVENTION

Interactive input systems that allow users to inject input (i.e. digital ink, mouse events etc.) into an application program using an active pointer (e.g. a pointer that emits light, sound or other signal), a passive pointer (e.g. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 and in U.S. Patent Application Publication No. 2004/0179001, all assigned to SMART Technologies ULC of Calgary, Alberta, Canada, assignee of the subject application, the entire disclosures of which are incorporated herein by reference; touch systems comprising touch panels employing electromagnetic, capacitive, acoustic or other technologies to register pointer input; laptop and tablet personal computers (PCs); smartphones, personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports imaging devices in the form of digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

In some interactive input systems, conventional projection units are employed to project a computer-generated image onto a surface with which a user interacts. For example, U.S. Pat. No. 6,540,366 to Keenan et al., assigned to SMART Technologies ULC, discloses an overhead projection system comprising an overhead projector support assembly extending generally horizontally from a generally vertical support surface. A touch-sensitive display screen having a display surface is mounted on the support surface beneath the projector support assembly. A projector is mounted on the projector support assembly adjacent its distal end and is aimed to project images onto the display surface of the touch-sensitive display screen. The touch-sensitive display screen outputs control signals in response to contacts made thereon. The control signals are then conveyed to a personal computer, which uses the control signals to update the application program being executed and to update the image projected onto the touch-sensitive display surface by the projector.

U.S. Pat. No. 6,281,878 to Montellese discloses an input device for detecting input with respect to a reference plane. The input device includes a light source, a light sensor and a processor. The light source provides a plane of light adjacent to a reference plane, such as a solid surface of a desktop, on which an input template image of a keyboard is projected by a projector. The light sensor, having an acute angle with respect to the reference plane, senses light reflected by an object, such as a finger, close to the plane of light and generates a signal indicative of sensed light. The processor determines a position of the object with respect to the reference plane based on response of the sensor.

U.S. Patent Application Publication No. 2011/0242060 to McGibney et al. entitled "Interactive Input System And Information Input Method Therefor" filed on Apr. 1, 2010 and assigned to SMART Technologies, ULC, discloses an interactive input system comprising at least one imaging assembly having a field of view looking into a region of interest and capturing image frames and processing structure in communication with the at least one imaging assembly. When a pointer exists in captured image frames, the processing structure demodulates the captured image frames to determine frequency components thereof and examines the frequency components to determine at least one attribute of the pointer.

U.S. Pat. No. 6,219,011 to Aloni et al. discloses an image projection based display apparatus using cameras to capture images of a display surface. The cameras capture a plurality of reference lines that are used to calibrate a plurality of images. The apparatus can also detect the distortion of the reference lines and apply a correction.

Although the above-mentioned interactive input systems enhance the reliability of determining pointer location, being able to resolve pointer location during sporadic system displacement is desired. It is therefore an object to provide a novel interactive input system and method.

SUMMARY OF THE INVENTION

Accordingly, in one aspect there is provided an interactive input system comprising at least one imaging device configured to capture image frames of a region of interest comprising a background and at least one background feature, and processing structure configured to compare the captured image frames to determine if the location of the at least one background feature has changed signifying system displacement.

In an embodiment, the processing structure is further configured to modify captured image frames to compensate for system displacement.

In an embodiment, the background feature provides illumination to the at least one imaging device. The at least one imaging device is positioned above a display surface within the region of interest. The illumination source provides a plane of illumination generally parallel to the display surface. The at least one pointer brought into proximity with the background reflects at least a portion of the plane of illumination towards the at least one imaging device. The at least one background feature reflects at least a portion of the plane of illumination towards the at least one imaging device.

In an embodiment, at least one of the image frames is captured in the event at least one pointer is brought into proximity of the background. The at least one of the image frames is a background image frame captured in the event no pointers are within proximity of the background.

In an embodiment, the processing structure is further configured to calculate a distortion based on the change in location of the at least one background feature. The processing structure is further configured to apply the distortion to one of the background image frame and the image frame captured in the event at least one pointer is brought into proximity of the background. The processing structure generates a difference image frame by subtracting the background image frame from the image frame captured in the event at least one pointer is brought into proximity of the background. The processing structure is further configured to identify the presence of the at least one pointer in the difference image frame. The processing structure is further configured to calculate the location of the at least one pointer.

In an embodiment, the background is at least one bezel at least partially surrounding a display surface within the region of interest.

According to another aspect there is provided a method of determining displacement of an interactive input system, the method comprising capturing image frames of a region of interest comprising a background and at least one background feature using at least one imaging device, and comparing the captured image frames to determine if the location of the at least one background feature has changed signifying system displacement.

A non-transitory computer readable medium embodying a computer program having computer program code for execution by a computer to perform the above method.

BRIEF DESCRIPTION OF THE DRAWINGS

Embodiments will now be described more fully with reference to the accompanying drawings in which.

DETAILED DESCRIPTION OF THE EMBODIMENTS

Figure 1:
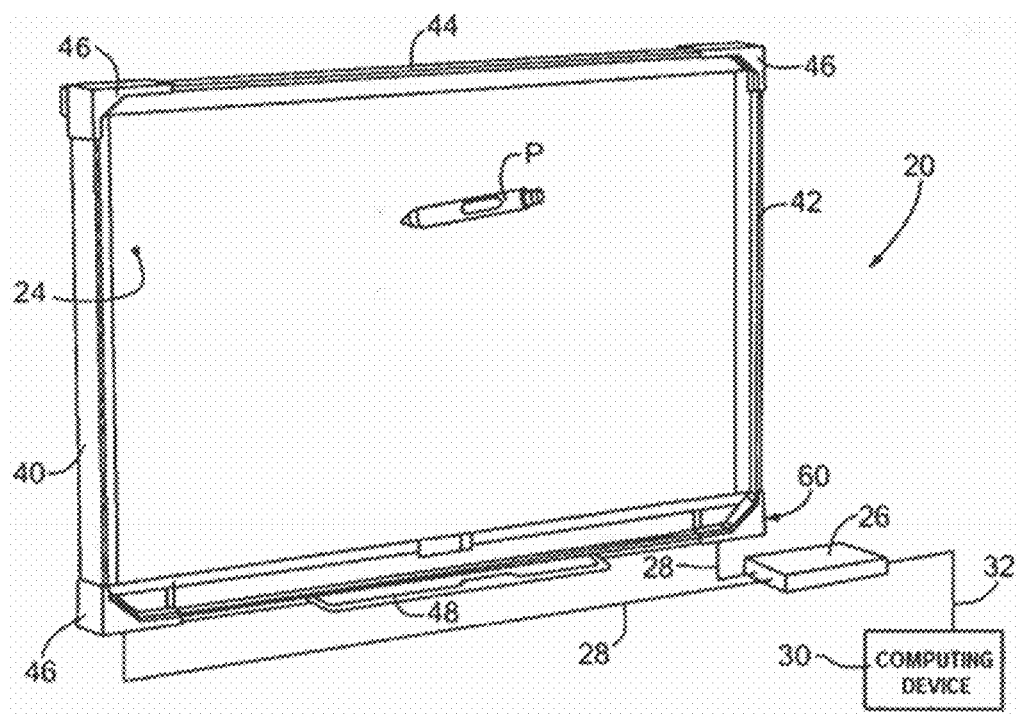
FIG. 1 is a perspective view of an interactive input system.
Figure 2:
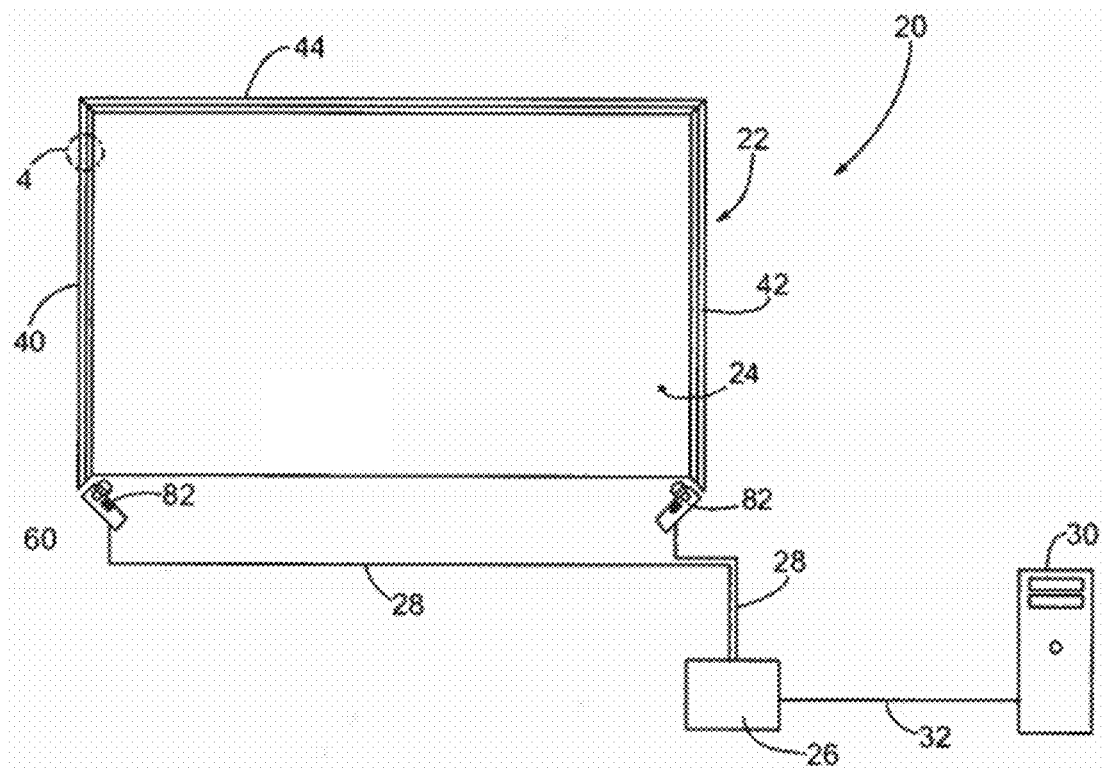
FIG. 2 is a schematic front elevational view of the interactive input system of FIG. 1.

Turning now to FIGS. 1 and 2, an interactive input system that allows a user to inject input such as digital ink, mouse events, commands etc. into an executing application program is shown and is generally identified by reference numeral 20. In this embodiment, interactive input system 20 comprises an assembly 22 that engages a display unit (not shown) such as for example, a plasma television, a liquid crystal display (LCD) device, a flat panel display device, a cathode ray tube, a rear projection unit, a front projection screen, etc. and surrounds the display surface 24 of the display unit. The assembly 22 employs machine vision to detect pointers brought into a region of interest in proximity with the display surface 24 and communicates with at least one digital signal processor (DSP) unit 26 via communication lines 28. The communication lines 28 may be embodied in a serial bus, a parallel bus, a universal serial bus (USB), an Ethernet connection or other suitable wired. The DSP unit 26 in turn communicates with a general purpose computing device 30 executing one or more application programs via a USB cable 32. Alternatively, the DSP unit 26 may communicate with the general purpose computing device 30 over another wired connection such as for example, a parallel bus, an RS-232 connection, an Ethernet connection etc. or may communicate with the general purpose computing device 30 over a wireless connection using a suitable wireless protocol such as for example Bluetooth, WiFi, ZigBee, ANT, IEEE 802.15.4, Z-Wave etc. General purpose computing device 30 processes the output of the assembly 22 received via the DSP unit 26 and adjusts image data that is output to the display unit so that the image presented on the display surface 24 reflects pointer activity within the region of interest. In this manner, the assembly 22, DSP unit 26 and general purpose computing device 30 allow pointer activity proximate to the display surface 24 to be recorded as writing or drawing or used to control execution of one or more application programs executed by the general purpose computing device 30.

Assembly 22 comprises a frame assembly that is integral with or attached to the display unit and surrounds the display surface 24. Frame assembly comprises a bezel having three bezel segments 40 to 44, four corner pieces 46 and a tool tray segment 48. Bezel segments 40 and 42 extend along opposite side edges of the display surface 24 while bezel segment 44 extends along the top edge of the display surface 24. The tool tray segment 48 extends along the bottom edge of the display surface 24 and supports one or more pen tools P and an eraser tool (not shown). The corner pieces 46 adjacent the top left and top right corners of the display surface 24 couple the bezel segments 40 and 42 to the bezel segment 44. The corner pieces 46 adjacent the bottom left and bottom right corners of the display surface 24 couple the bezel segments 40 and 42 to the tool tray segment 48. In this embodiment, the corner pieces 46 adjacent the bottom left and bottom right corners of the display surface 24 accommodate imaging assemblies 60 that look generally across the entire display surface 24 from different vantages. The bezel segments 40 to 44 are oriented so that their inwardly facing surfaces are seen by the imaging assemblies 60.

Figure 3:
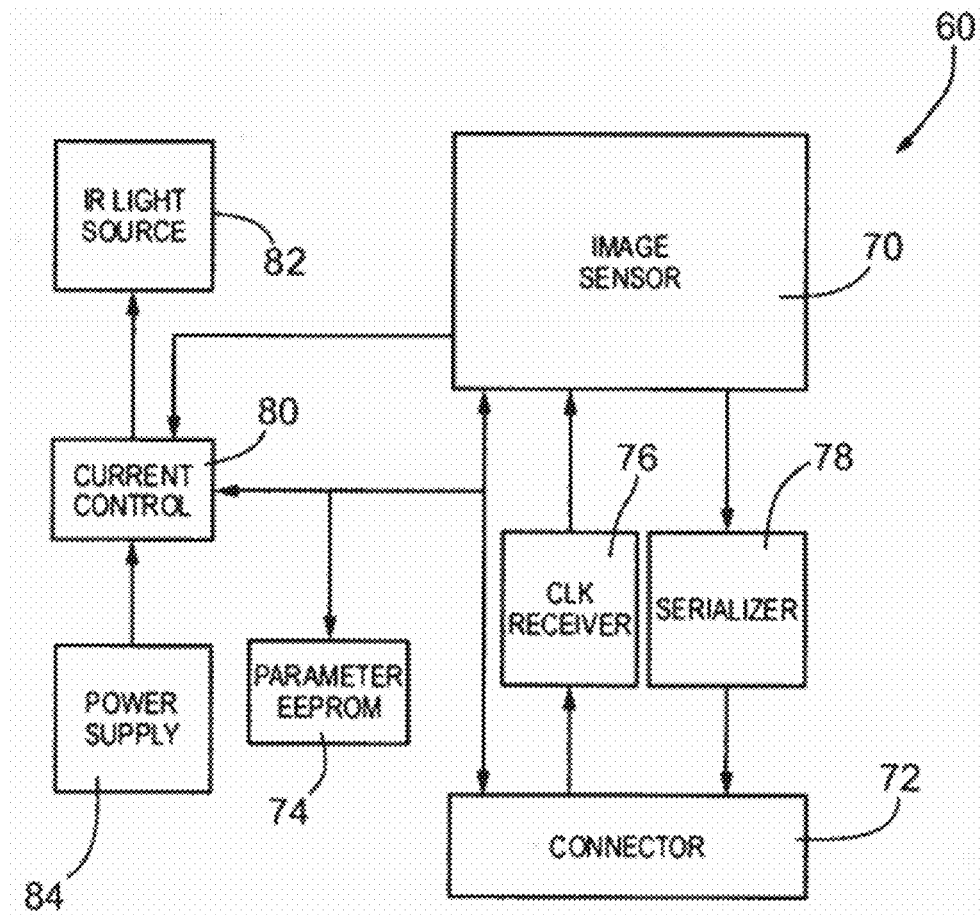
FIG. 3 is a block diagram of an imaging assembly forming part of the interactive input system of FIG. 1.

Turning now to FIG. 3, one of the imaging assemblies 60 is better illustrated. As can be seen, the imaging assembly 60 comprises an image sensor 70 such as that manufactured by Micron under model No. MT9V022 fitted with an 880 nm lens of the type manufactured by Boowon under model No. BW25B. The lens has an IR-pass/visible light blocking filter thereon (not shown) and provides the image sensor 70 with a 98 degree field of view so that the entire display surface 24 is seen by the image sensor 70. The image sensor 70 is connected to a connector 72 that receives one of the communication lines 28 via an I²C serial bus. The image sensor 70 is also connected to an electrically erasable programmable read only memory (EEPROM) 74 that stores image sensor calibration parameters as well as to a clock (CLK) receiver 76, a serializer 78 and a current control module 80. The clock receiver 76 and the serializer 78 are also connected to the connector 72. Current control module 80 is also connected to an infrared (IR) light source 82 comprising one or more IR light emitting diodes (LEDs) or other suitable radiation source(s) that provides illumination to the region of interest as well as to a power supply 84 and the connector 72.

The clock receiver 76 and serializer 78 employ low voltage, differential signaling (LVDS) to enable high speed communications with the DSP unit 26 over inexpensive cabling. The clock receiver 76 receives timing information from the DSP unit 26 and provides clock signals to the image sensor 70 that determines the rate at which the image sensor 70 captures and outputs image frames. Each image frame output by the image sensor 70 is serialized by the serializer 78 and output to the DSP unit 26 via the connector 72 and the communication lines 28.

Figure 4:
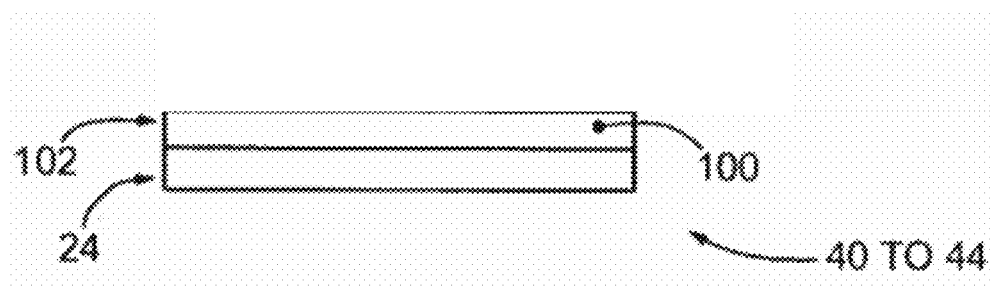
FIG. 4 is a front elevational view of a portion of a bezel segment forming part of the interactive input system of FIG. 1.

FIG. 4 shows a portion of the inwardly facing surface 100 of one of the bezel segments 40 to 44. As can be seen, the inwardly facing surface 100 comprises a longitudinally extending strip or band 102. In this embodiment, the inwardly facing surface 100 of the bezel segment comprises band 102 formed of a retro-reflective material. To take best advantage of the properties of the retro-reflective material, the bezel segments 40 to 44 are oriented so that their inwardly facing surfaces extend in a plane generally normal to that of the display surface 24.

Figure 5:
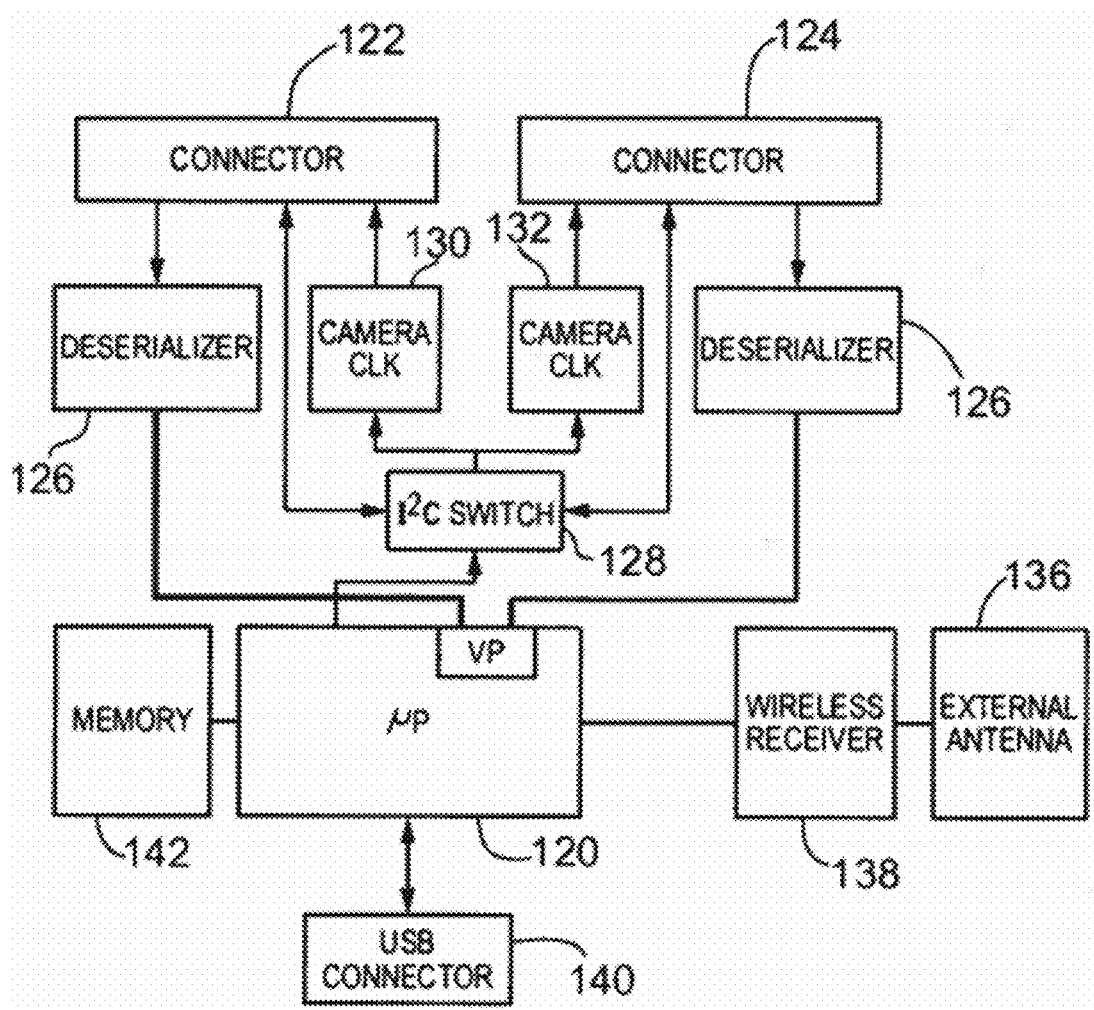
FIG. 5 is a block diagram of a master controller forming part of the interactive input system of FIG. 1.

Turning now to FIG. 5, the DSP unit 26 is better illustrated. As can be seen, DSP unit 26 comprises a controller 120 such as for example, a microprocessor, microcontroller, DSP etc. having a video port VP connected to connectors 122 and 124 via deserializers 126. The controller 120 is also connected to each connector 122, 124 via an I²C serial bus switch 128. I²C serial bus switch 128 is connected to clocks 130 and 132, each clock of which is connected to a respective one of the connectors 122, 124. The controller 120 communicates with an external antenna 136 via a wireless receiver 138, a USB connector 140 that receives USB cable 32 and memory 142 including volatile and non-volatile memory. The clocks 130 and 132 and deserializers 126 similarly employ low voltage, differential signaling (LVDS).

The general purpose computing device 30 in this embodiment is a personal computer or other suitable processing device comprising, for example, a processing unit, system memory (volatile and/or non-volatile memory), other non-removable or removable memory (eg. a hard disk drive, RAM, ROM, EEPROM, CD-ROM, DVD, flash memory, etc.) and a system bus coupling the various computing device components to the processing unit. The general purpose computing device 30 may also comprise a network connection to access shared or remote drives, one or more networked computers, or other networked devices.

The interactive input system 20 is able to detect passive pointers such as for example, a user's finger, a cylinder or other suitable object as well as active pen tools P that are brought into proximity with the display surface 24 and within the fields of view of the imaging assemblies 60.

During operation, the controller 120 conditions the clocks 130 and 132 to output clock signals that are conveyed to the imaging assemblies 60 via the communication lines 28. The clock receiver 76 of each imaging assembly 60 uses the clock signals to set the frame rate of the associated image sensor 70. The controller 120 also signals the current control module 80 of each imaging assembly 60 over the I²C serial bus. In response, each current control module 80 connects the IR light source 82 to the power supply 84.

The IR light sources flood the region of interest over the display surface 24 with infrared illumination. Infrared illumination that impinges on the retro-reflective bands 102 of the bezel segments 40 to 44 is returned to the imaging assemblies 60. The configuration of each IR light source 82 is selected so that the retro-reflective bands 102 are generally evenly illuminated over their entire lengths. Exemplary IR light source configurations to achieve generally even bezel illumination are described in U.S. Patent Application Publication No. 2009/0278795 to Hansen et al. entitled "Interactive Input System And Illumination Assembly Therefor" filed on May 9, 2008 and assigned to SMART Technologies ULC, the entire disclosure of which is incorporated herein by reference. Of course, those of skill in the art will appreciate that other illumination techniques may be employed. As a result, in the absence of a pointer, the image sensor 70 of each imaging assembly 60 sees a generally continuous bright band. When a passive pointer, such as for example, a user's finger, a cylinder or other suitable object, is brought into proximity with the display surface 24 and is sufficiently distant from the IR light sources 82, the pointer occludes infrared illumination reflected by the retro-reflective bands 102. As a result, the pointer appears as a dark region that interrupts the bright band in captured image frames. When an active pointer, such as for example a pen tool, is brought into proximity with the display surface 24 and is sufficiently distant from the IR light sources 82, the intensity of the IR illumination emitted from active pointer is higher than the intensity of the IR light sources 82. As a result, the active pointer appears as a brighter region than the bright band in captured image frames.

The controller 120 generates a background image frame by averaging ten (10) image frames captured when no pointer is present. A background vertical intensity profile (VIP) is generated for each pixel column in the background image frame. Approaches for generating VIPs are described in U.S. Patent Application Publication No. 2009/0277697 to Bolt et al., and assigned to SMART Technologies ULC, the disclosure of which is incorporated herein by reference in its entirety. In this embodiment, the VIP is generated by first cropping the background image frame to reduce its size from 752×480 pixels to 752×60 pixels and to center the cropped background image frame along the length of the bright band in the cropped difference image frame. The controller 120 then calculates an average intensity value of the sixty (60) pixels in each of the 752 pixel columns of the cropped background image frame. As will be understood, pixel columns corresponding to non-occluded areas of the retro-reflective bands 102 will have a low average intensity value, while pixel columns corresponding to occluded areas of the retro-reflective bands 102 will have a high average intensity value. These 752 average intensity values are then represented as a function of pixel column position, x, to yield the background VIP.

As mentioned above, each image frame output by the image sensor 70 of each imaging assembly 60 is conveyed to the DSP unit 26. The controller 120 of the DSP unit 26 processes each image frame output by the image sensor 70 of each imaging assembly 60. Generally, the controller 120 calculates the vertical intensity profile (VIP) of each image frame similar to the method used for calculating the background VIP.

A difference VIP is generated by subtracting the background VIP from the VIP of each received image frame. So long as ambient light levels in the received image frame and background image frame are similar, ambient light is substantially cancelled out and does not appear in the difference VIP. After the difference VIP has been generated, the controller 120 identifies intensity values therein that exceed defined thresholds and thus, that represent the likelihood that a pointer exists in the difference image frame. When no pointer is in proximity with the display surface 24, the intensity values of the VIP all fall below the defined thresholds. When a passive pointer is in proximity with the display surface 24, some of the intensity values fall below a threshold value allowing the existence of the passive pointer in the difference image frame to be readily determined. When an active pointer is in proximity with the display surface 24, some of the intensity values surpass a threshold value allowing the existence of an active pointer in the difference image frame to be readily determined. With the existence of each pointer in each difference image frame determined, the controller calculates the position of each pointer relative to the display surface 24 using known triangulation.

Figure 6:
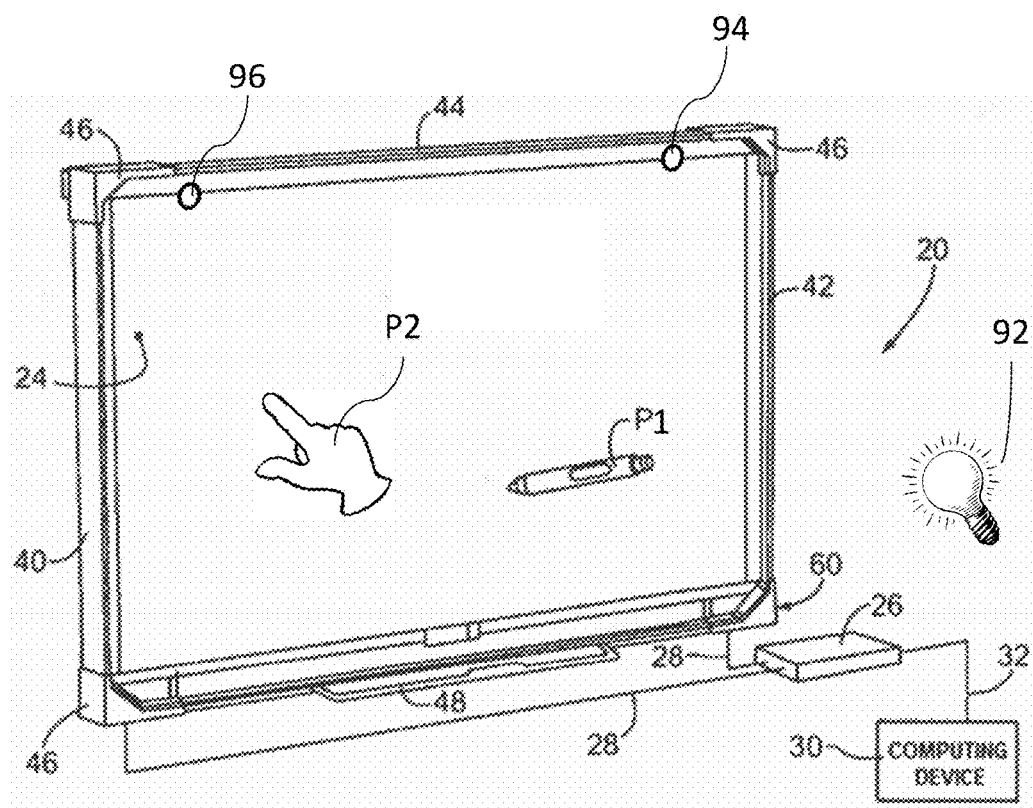
FIG. 6 is another perspective view of the interactive input system of FIG. 1, showing two (2) pointers in proximity therewith.

As will be appreciated, in the event one or more pointers are brought into proximity with the display surface 24, the position of each pointer relative to the display surface 24 can readily and accurately determined based on the location of each pointer appearing in the captured image frames. However, in the event that the interactive input system 20 undergoes sudden movement due to for example, a user bumping into the interactive input system 20 or slamming a door causing the support surface on which the interactive input system 20 is mounted to vibrate, it is possible for the locations of the pointers to temporarily displace causing the interactive input system 20 to generate false targets. For example, FIG. 6 illustrates a scenario in which two (2) pointers, P1 and P2, have been brought into proximity with the display surface 24. In the example shown, an ambient light source 92, which may be a light bulb, solar radiation or other source of unwanted light, emits radiation that impinges on the top bezel segment 44 and appears as a bright ambient light artifact 94 on the retro-reflective band of the bezel segment 44. An occlusion element 96 such as for example, a piece of non-reflective tape that is not intended to be part of system 20 or other obstruction that occludes light reflected by the retro-reflective band on the bezel segment 44 is also present.

Pointer P1 in this embodiment is an active pointer comprising a tip section that emits non-visible IR illumination when the tip section is brought into contact with the display surface 24 with a force that exceeds a threshold activation force and is sufficient to actuate a tip switch of the pointer. The intensity of the IR illumination emitted from the tip section is higher than the intensity of the IR light sources 82 such that the pointer P1 is detectable in image frames captured when the IR light sources 82 are on. Pointer P2 in this embodiment is a passive pointer, such as a finger, stylus or other suitable object. As will be appreciated, if the imaging assemblies 60 or the ambient light source 92 were to suddenly move, ambient light artifacts in captured image frames may not align with ambient light artifacts in the stored background image frame and thus, the resultant difference image frames may comprise false positive pointer detections. Another problem associated with sudden movement of the imaging assemblies 60 is that the locations of the pointers in the captured image frames may suddenly appear to change even though the pointers remain stationary, causing the interactive input system to calculate pointer locations that do not reflect the true location of the pointers.

Figure 7:
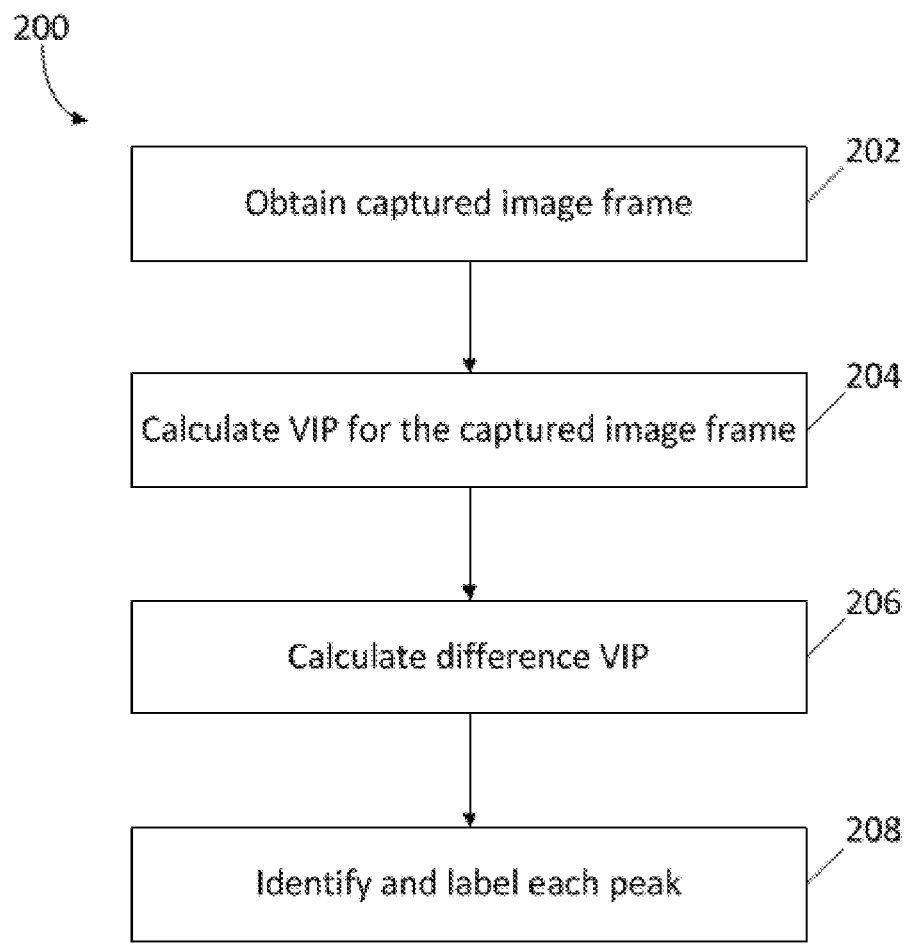
FIG. 7 is a flowchart showing steps of a capture image frame processing method used by the interactive input system of FIG. 1.

To resolve pointer locations, the interactive input system 20 employs the image frame processing method shown in FIG. 7 and generally indicated using reference numeral 200. In this embodiment, image frame processing method 200 is carried out by the controller 120 which processes successive captured image frames output by the image sensor 70 of each imaging assembly 60. Prior to image frame processing method 200, a background VIP is calculated for the background image frame. For each imaging assembly 60, when an image frame that has been captured when the IR light sources 82 are on is received, the controller 120 stores the image frame in a buffer (step 202). The controller 120 calculates a captured VIP for the captured image frame (step 204). A difference VIP is calculated by subtracting the background VIP from the captured VIP (step 206). Once the difference VIP has been calculated, each peak in the difference VIP is identified (step 208).

Figure 8A:
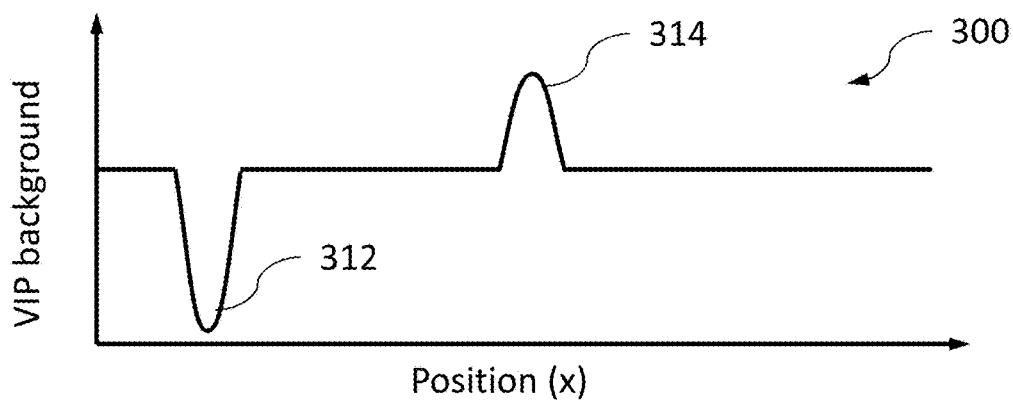
FIGS. 8a, 8b and 8c are graphical plots of a background vertical intensity profile (VIP), a captured VIP and a difference VIP, respectively, generated from a captured image frame in which no pointers are imaged.

FIG. 8a shows a background VIP 300 based on the background image frame. The background VIP 300 comprises a valley 312 and a peak 314 located along a positive offset. The positive offset is caused by illumination emitted by the IR light source 82 that reflects off bezel segments 44 and 42 back to the image sensor 70 of the imaging assembly 60 located in the lower left corner of assembly 22. Valley 312 is caused by occluding element 96 that occludes illumination. Peak 314 is the result of ambient light artifact 94 appearing on the bezel segment 44 and being captured in image frames.

Figure 8B:
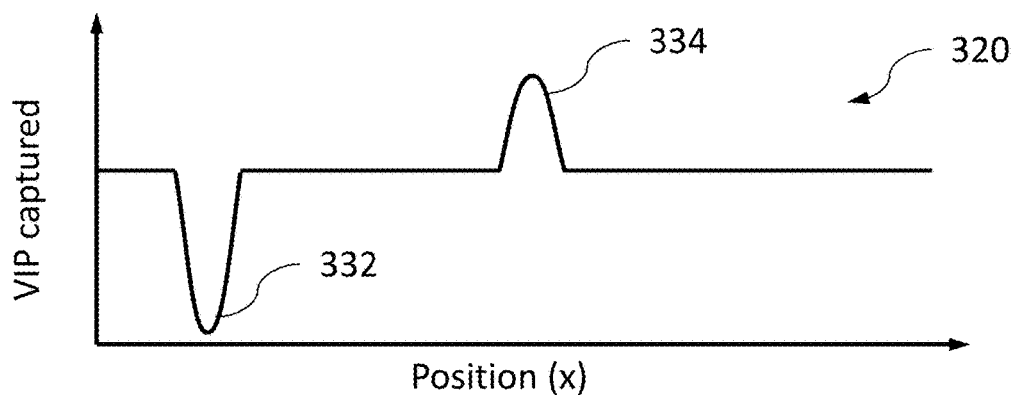

FIG. 8b shows a captured VIP 320 based on an image frame captured by the imaging assembly 60 when pointers P1 and P2 are not present. As can be seen, the captured VIP 320 appears generally the same as background VIP 300 and includes valley 332 and peak 334 corresponding to valley 312 and peak 314. Since pointers P1 and P2 are not present, it is expected that captured VIP 320 is generally the same as background VIP 300.

Figure 8C:
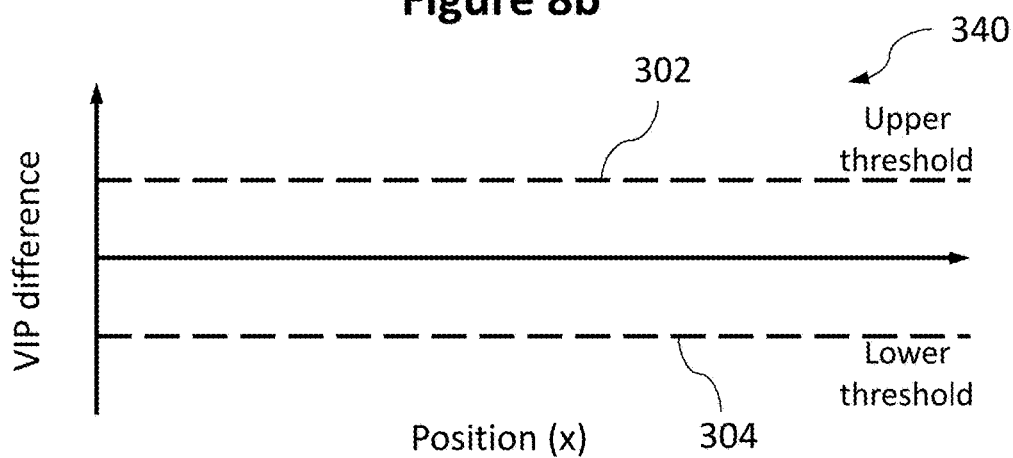

Turning now to FIG. 8c, a difference VIP 340 is generated according to method 200 described above, using the background VIP 300 of FIG. 8a and the captured VIP 320 of FIG. 8b. As can be seen, the background VIP 300 and captured VIP 320 cancel each other out. As such, the intensity profile of difference VIP 340 has a substantially zero value across the entire x position.

Figure 9A:
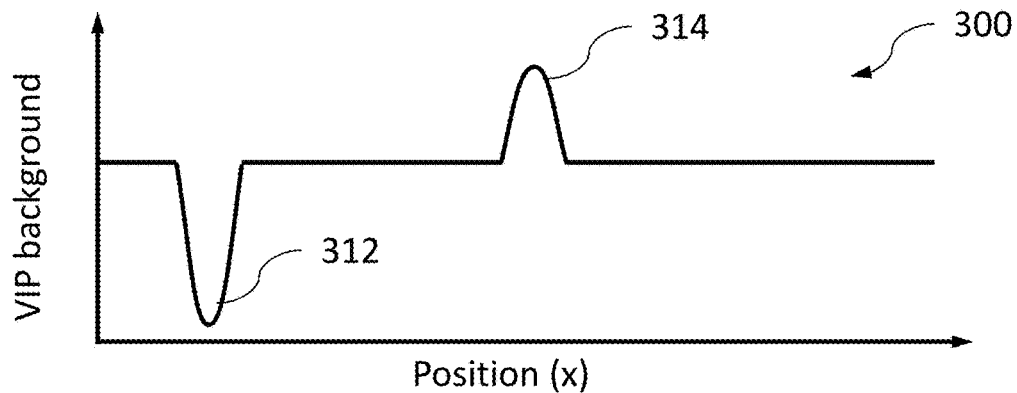
FIGS. 9a, 9b and 9c are graphical plots of a background VIP, a captured VIP and a difference VIP, respectively, generated from a captured image frame in which the two pointers of FIG. 6 are imaged.

FIG. 9a shows an exemplary background VIP 300 based on image frames captured by the imaging assembly 60 when pointers P1 and P2 are not present. As will be appreciated, background VIP 300 shown in FIG. 9a is the same as background VIP 300 shown in FIG. 8a and thus comprises valley 312 and peak 314.

Figure 9B:
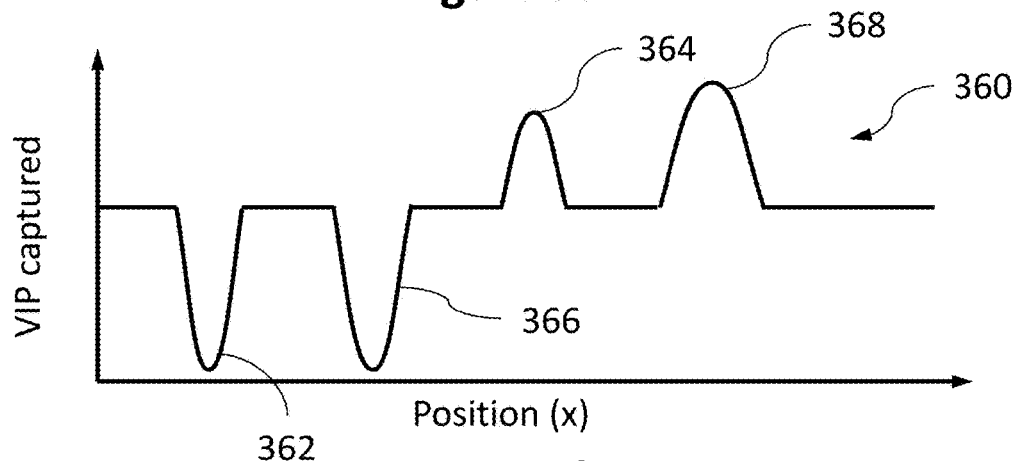

FIG. 9b shows an exemplary captured VIP 360 based on an image frame captured by the imaging assembly 60 in the event that pointers P1 and P2 are in proximity with the display surface 24. As can be seen, the captured VIP 360 similarly comprises valley 362 and peak 364 corresponding to valley 312 and peak 314. However, captured VIP 360 also comprises valley 366 and peak 368. Since pointer P2 is a passive pointer (finger), a valley 366 is caused by pointer P2 that occludes the bezel segment 44 and thus appearing as a dark region on the bright background in image frames captured by imaging assembly 60. Since pointer P1 is an active pointer (pen tool), peak 368 is the result of pointer P1 emitting illumination and appearing as a brighter region than the bright background in image frames captured by imaging assembly 60.

Figure 9C:
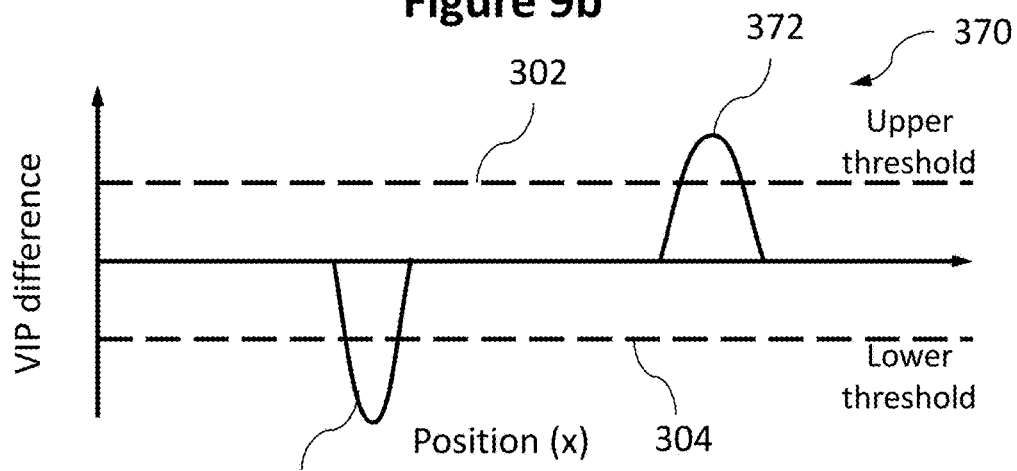

Turning now to FIG. 9c, a difference VIP 370 is generated according to method 200 described above, using the background VIP 300 of FIG. 9a and the captured VIP 360 of FIG. 9b. As can be seen, difference VIP 370 comprises a single peak 372 and a single valley 374 corresponding to peak 368 and valley 366 of the captured VIP 360, respectively. Valley 362 of captured VIP 360 is negated by valley 312 of background VIP 300 and similarly peak 364 of difference VIP 370 is negated by peak 314 of background VIP 300. The remaining values of difference VIP 370 have a substantially zero value. The remaining intensities in difference VIP 370 found above upper threshold 302 and below lower threshold 304 are indicative of pointer locations and these peak locations are used to calculate the position of each of the pointers P1 and P2 in (x,y) coordinates relative to the display surface 24 using triangulation in the well-known manner, such as that described in above-incorporated U.S. Pat. No. 6,803,906 to Morrison et al.

The calculated pointer coordinates may then be analyzed to determine if an ambiguity exists. If an ambiguity is determined to exist, the pointer coordinates are then subjected to an ambiguity removal process. Ambiguity identification and removal methods are disclosed in U.S. Patent Application Publication No. 2010/0201812 to McGibney et al. entitled "Active Display Feedback in Interactive Input Systems" filed on Feb. 11, 2009 and assigned to SMART Technologies, ULC, the disclosure of which is herein incorporated by reference in its entirety.

When the interactive input system is subject to sudden movement caused by, for example, a user accidentally bumping into the interactive input system, the imaging assemblies 60 may temporarily move causing the position of peaks and valleys within a captured VIP to shift along the x position and thus create false pointer locations within the corresponding difference VIP.

Figure 10A:
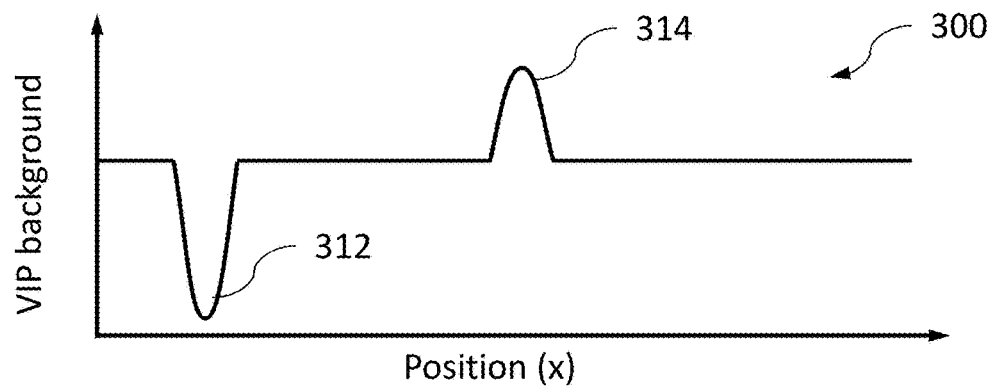
FIGS. 10a, 10b and 10c are graphical plots of a background VIP, a captured VIP and a difference VIP, respectively, generated from a captured image frame in which the two pointers of FIG. 6 are imaged during system displacement.

FIG. 10a shows an exemplary background VIP 300 based on image frames captured by one of the imaging assemblies 60 when pointers P1 and P2 are not present. As will be appreciated, background VIP 300 shown in FIG. 10a is the same as background VIP 300 shown in FIGS. 8a and 9a and thus comprises valley 312 and peak 314.

Figure 10B:
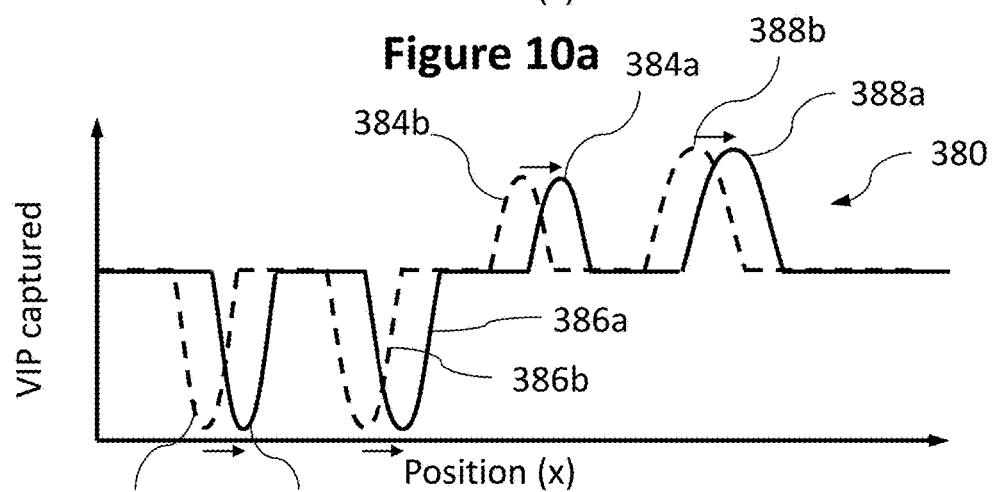

FIG. 10b shows an exemplary captured VIP 380 based on an image frame captured by the imaging assembly 60, when pointers P1 and P2 are in proximity with the display surface 24. However, in this example, the image frame is captured while the interactive input system is subject to movement causing the imaging assemblies 60 to temporarily change their fields of view. As a result, the captured VIP 380 comprises valley 382a and peak 384a corresponding to valley 312 (superimposed onto FIG. 10b as valley 382b) and peak 314 (superimposed onto FIG. 10b as peak 384b) of the background VIP 300 shown in FIG. 10A; however valley 382a and peak 384a are shifted (with respect to valley 382b and peak 384b) due to the unintended movement of the imaging assembly 60. Captured VIP 380 also comprises valley 386a and peak 388a. Since pointer P2 is a passive pointer (finger), valley 386a is caused by pointer P2 that occludes bezel segment 44 and thus appears as a dark region on the bright background in image frames captured by the imaging assembly 60. Since pointer P1 is an active pointer (pen tool), peak 388a is the result of pointer P1 emitting illumination and appearing as a brighter region than the bright background in image frames captured by the imaging assembly 60. Since the imaging assemblies 60 have unintentionally moved during image frame capture, valley 386a and peak 388b are erroneous. The actual location of pointers P2 and P1 are shown (for illustrative purposes) on FIG. 10B as valley 386b and peak 388b.

Figure 10C:
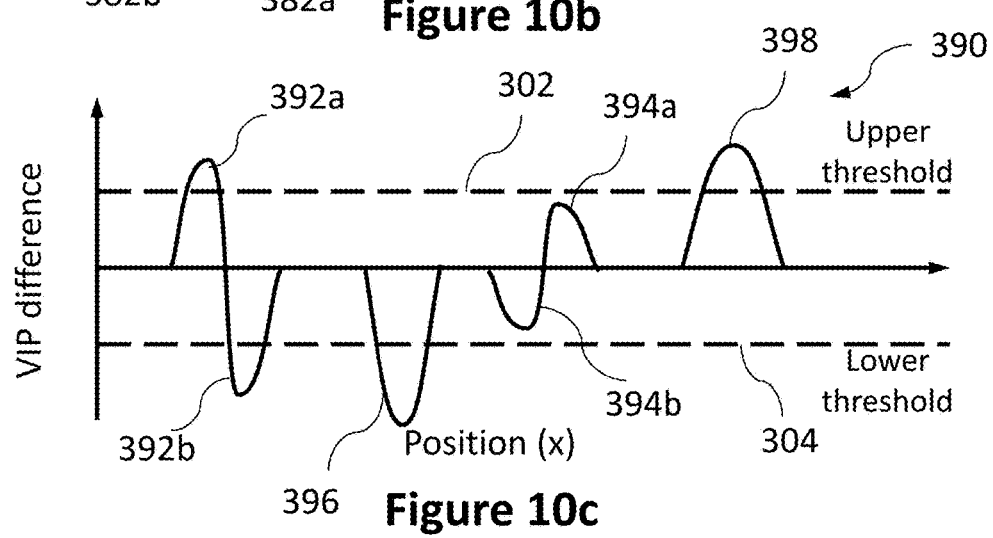

Turning now to FIG. 10c, a difference VIP 390 is generated according to method 200 described above, using the background VIP 300 of FIG. 10a and the captured VIP 380 of FIG. 10b. As can be seen, difference VIP 390 comprises a peak 392a and a valley 392b, caused by the difference in positions of valley 312 and valley 382a in background VIP 300 and captured VIP 380, respectively; a valley 396 caused by valley 386a of captured VIP 380; a valley 394b and a peak 394a caused by the difference between the peak 314 of background VIP 300 and the peak 384a of captured VIP 380; and a peak 398 caused by peak 388a of captured VIP 380. Since the intensity of bright spot 94 on bezel segment 44 is sufficiently low in the difference VIP 390, peak 394a and valley 394b do not exceed upper threshold 302 or lower threshold 304, respectively, and therefore do not cause the interactive input system to attempt to calculate the positions of these points.

Two unwanted consequences are created in the exemplary scenario of FIG. 6 when the interactive input system is subject to sudden movement as described above with reference to FIGS. 10a to 10c. The first unwanted consequence is the introduction of false pointer locations caused by peak 392a exceeding upper threshold 302 and valley 392b exceeding lower threshold 304. This creates false pointer locations to be calculated and displayed on display surface 24 leading to an undesirable user experience. The second unwanted consequence is the incorrectly calculated location of pointers P1 and P2 with reference to the display surface 24. This causes the displayed location of pointers P1 and P2 to suddenly change which may cause an undesirable path of a digital ink stroke leading to an undesirable user experience.

Figure 11:
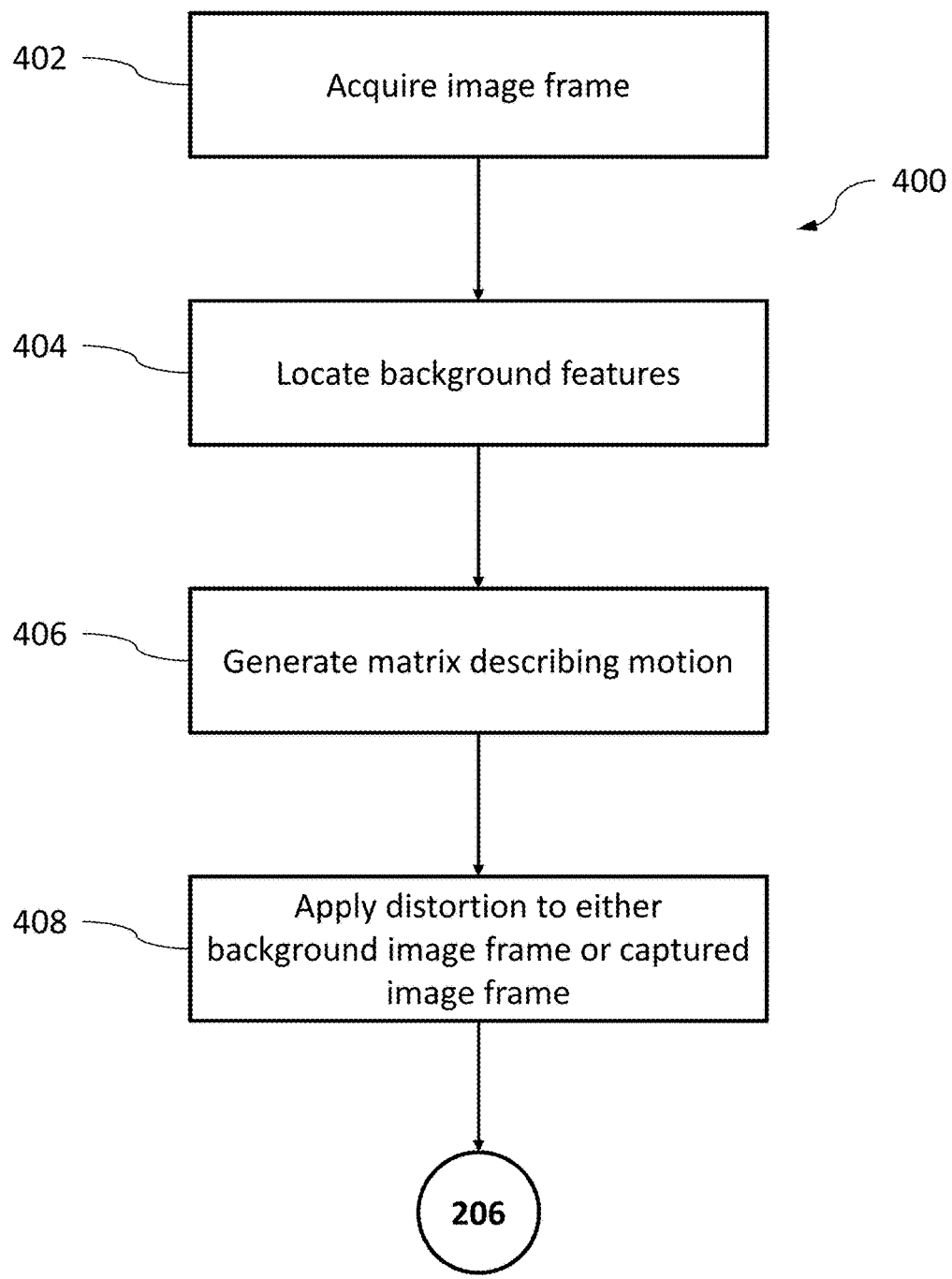
FIG. 11 is a flowchart showing steps of a displacement compensating method used by the interactive input system of FIG. 1 to eliminate the effects of system displacement.

To overcome these unwanted consequences, the interactive input system processes all newly acquired image frames according to the method 400 of FIG. 11. Once a background VIP has been generated, image frames are acquired by the image sensor 70 of each imaging assembly 60 (step 402). The VIP of the captured image is calculated and background features in both the background VIP and the captured VIP are then located (step 404). These background features are distinct and stationary features found in the background VIP, such as peak 312 caused by occlusion 96 and valley 314 caused by bright spot 94. The difference in location of these background features in the captured VIP due to movement of imaging assembly 60 is then calculated using linear matrix multiplication by creating a linear matrix (step 406). The linear matrix is then used to apply a distortion to the background VIP (step 408) before it is processed according to method 200 described with reference to FIG. 7. As will be appreciated, the distortion in step 408 may also be applied to the captured VIP before being processed as described in method 200. The distortion aligns background features in the background VIP with background features in the captured VIP, so that when the difference VIP is generated it does not include valleys and/or peaks representative of false targets or inaccurate pointer locations.

To augment the effectiveness of this methodology, dedicated background features may be included on bezel segments 40 to 44. For example, in one embodiment, the dedicated background features are small light sources, such as for example miniature light emitting diodes (LEDs) positioned at a location on the retro reflective surface of the bezel segments 40 to 44. This helps the interactive input system track motion by not having to rely on naturally occurring background features that may not always be present or may not be sufficient enough to allow for reliable background feature motion tracking.

Figure 12:
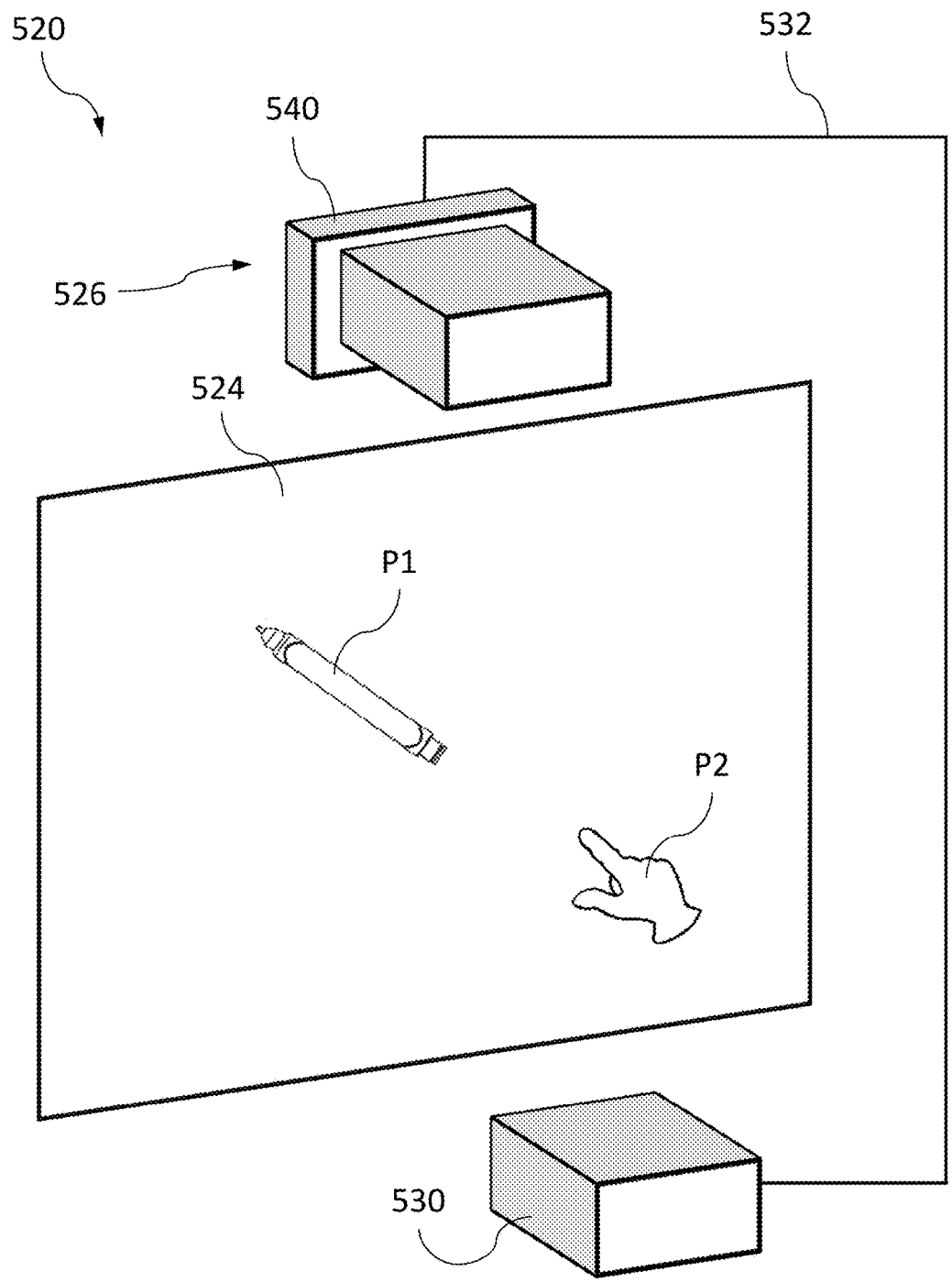
FIG. 12 is a perspective view of an alternative interactive input system showing two (2) pointers in proximity therewith.
Figure 13:
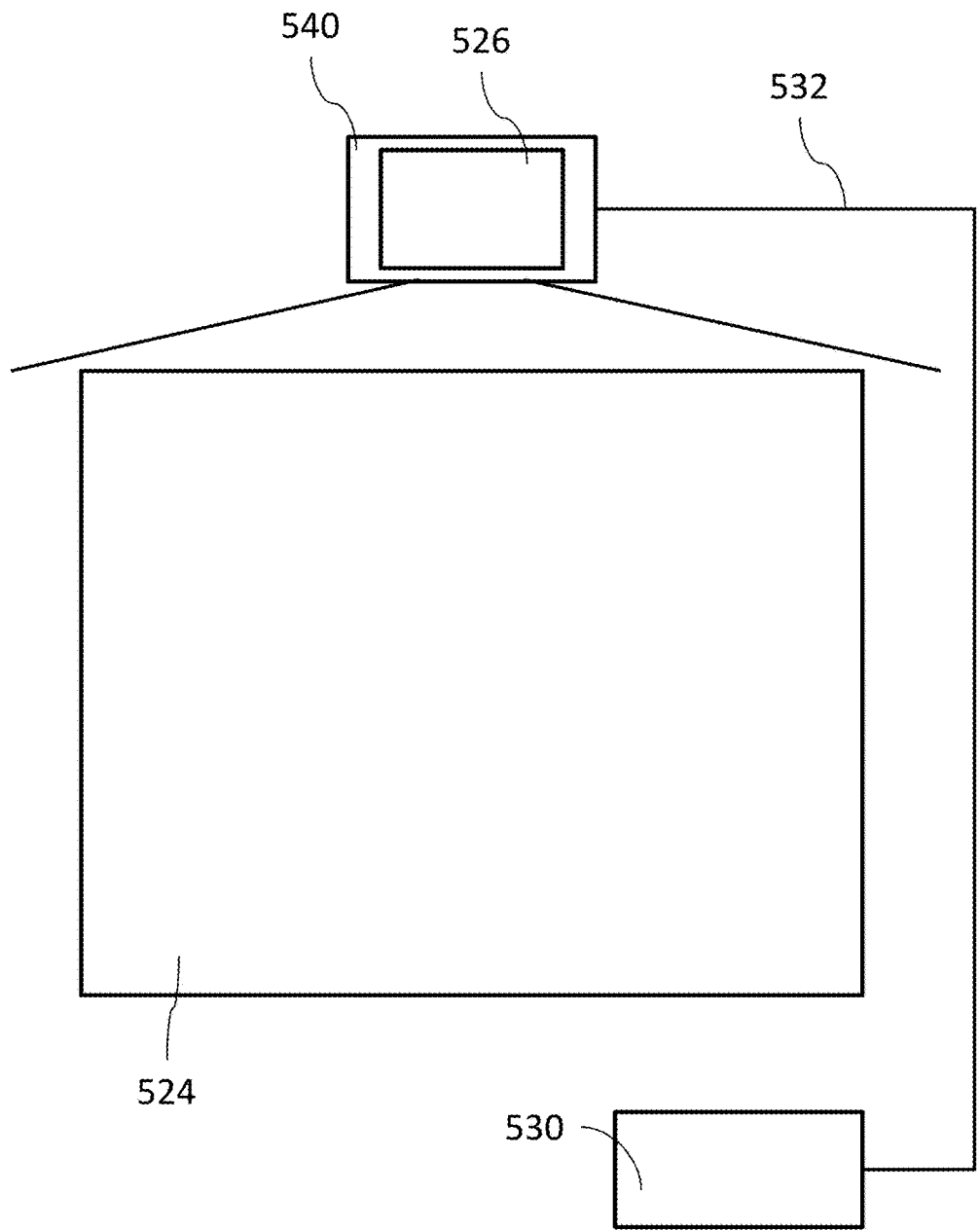
FIG. 13 is a schematic front elevational view of the interactive input system of FIG. 12.
Figure 14:
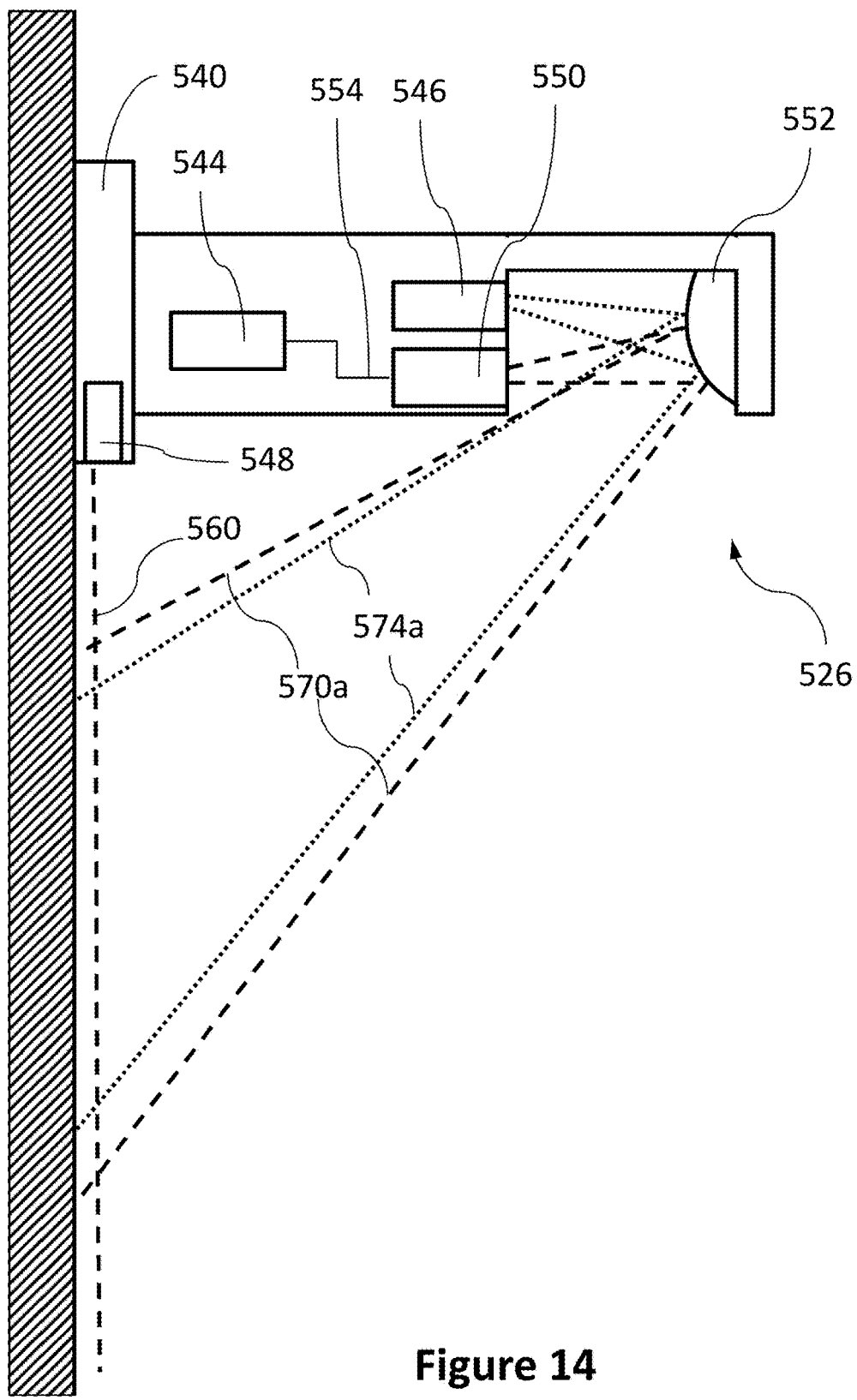
FIG. 14 is a schematic side elevational view of the interactive input system of FIG. 12.

Turning now to FIGS. 12 to 14, another embodiment of an interactive input system is shown and is generally identified by reference numeral 520. In this embodiment, interactive input system 520 comprises a display surface 524 and an overhead unit 526 in communication with a general purpose computing device 530 executing one or more application programs via a wired connection such as for example a USB cable 532.

The overhead unit 526 comprises a base assembly 540, a digital signal processor (DSP) unit 544, a projection unit 546, a light curtain module 548, an imaging assembly 550, and a curved mirror 552.

The base assembly 540 comprises a mounting structure (not shown) allowing overhead unit 526 to be mounted on a vertical surface such as for example a wall or a horizontal surface such as for example a table.

The DSP unit 544 communicates with the general purpose computing device 530 via USB cable 532. Alternatively, the DSP unit 544 may communicate with the general purpose computing device 530 over another wired connection such as for example, a parallel bus, an RS-232 connection, an Ethernet connection etc. or may communicate with the general purpose computing device 530 over a wireless connection using a suitable wireless protocol such as for example Bluetooth, WiFi, ZigBee, ANT, IEEE 802.15.4, Z-Wave, etc.

The projection unit 546 projects images received from the general purpose computing device 530 via a USB cable (not shown) onto the display surface 524 via curved mirror 552, as indicated by dotted lines 574a, shown in FIG. 14.

The light curtain module 548 comprises an infrared (IR) light source such as for example one or more IR laser diodes and optical components for generating a light plane 560, such as that shown in FIG. 14. The light plane 560 is spaced from is generally parallel to the display surface 524 and has a narrow width. In this embodiment the light plane 560 is generally continuously emitted.

The imaging assembly 550 has a field of view encompassing the display surface 524 via curved mirror 552, indicated by dashed lines 570a in FIG. 14, and captures image frames thereof to detect IR light emitted by the light curtain module 548 that has been reflected by a pointer brought into proximity with the display surface 524. In this embodiment, imaging assembly 550 comprises an image sensor (not shown) having a resolution of 752×480 pixels, such as that manufactured by Micron under model No. MT9V034 and is fitted with an optical imaging lens (not shown). The optical imaging lens has an IR-pass/visible light blocking filter thereon (not shown) such that IR light emitted by the light curtain module 548 and reflected by a pointer brought into proximity with the display surface 524 appears in image frames captured by imaging assembly 550. The optical imaging lens provides the image sensor with a 160 degree field of view, and covers a diagonal display surface of up to 102 inches in any of 16:9, 16:10 or 4:3 aspect ratios. The imaging assembly 550 communicates with DSP unit 544 via communication lines 554 and sends captured image frames thereto. The communication lines 554 may be embodied in a serial bus, a parallel bus, a universal serial bus (USB), an Ethernet connection or other suitable wired or wireless connection.

General purpose computing device 530 receives captured image frames from the DSP unit 544 and processes the captured image frames to detect pointer activity. The general purpose computing device 530 adjusts image data that is output to the projection unit 546 and such that the image presented on the display surface 524 reflects pointer activity. In this manner, pointer activity proximate to the display surface 524 is recorded as writing or drawing or used to control the execution of one or more application programs executed by the general purpose computing device 530.

Figure 15:
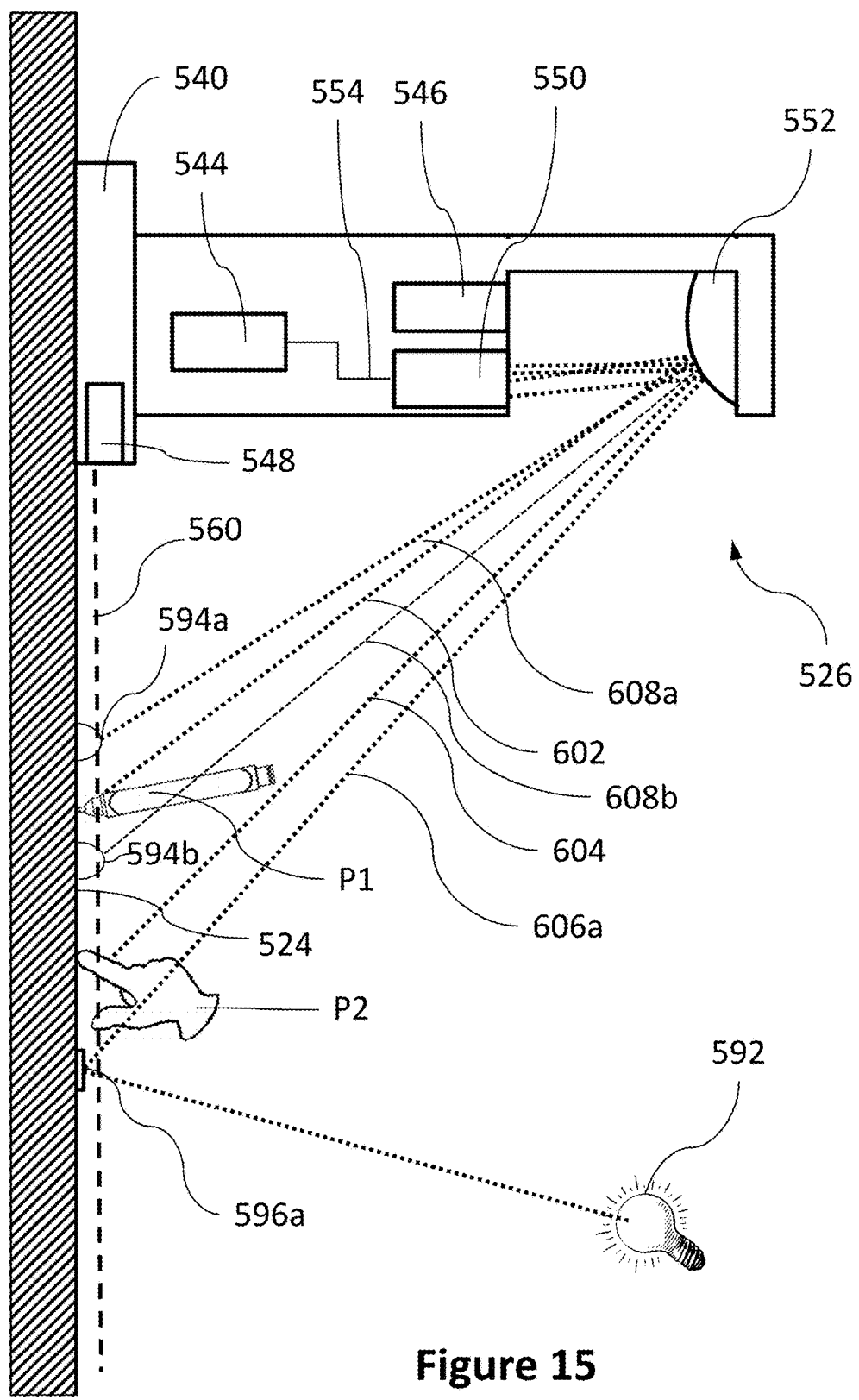
FIG. 15 is another schematic side elevational view of the interactive input system of FIG. 12 showing light paths from wanted and unwanted light sources.

As shown in FIG. 15, in the event pointers P1 and P2 are brought into proximity with the display surface 524, pointers P1 and P2 break light plane 560 and thus reflect light towards imaging assembly 550. In particular, pointers P1 and P2 cause light beams 602 and 604, respectively, to reflect back to imaging assembly 550. Pointers P1 and P2 in this embodiment are passive pointers and can be fingers, styluses, erasers, balls or other suitable objects. Since ideal environments rarely exist during real world operation, unwanted light beams from other sources may appear in image frames captured by imaging assembly 550, such as light beams 606a, 606b, 608a and 608b, which may cause false pointers to appear in image frames. In this example, light beams 606a and 606b are caused by ambient light source 592 reflecting off display surface 524 causing bright spots 596a and 596b, respectively, to appear in image frames captured by imaging assembly 550. As mentioned previously, imaging assembly 550 comprises an IR pass filter in the optical pathway such that any illumination outside of the IR spectrum is not captured by the imaging assembly 550. Therefore only ambient light that is within the infrared spectrum is captured by imaging assembly 550. In this embodiment, ambient light source 592 emits light in a broad spectrum including infrared. Another source of unwanted light beams may be caused by imperfections on the display surface 524 that protrude sufficiently to break light plane 560. In this embodiment, the interactive input system 520 comprises protrusions 594a and 594b that are sufficiently large enough to break light plane 560 and thus cause light to reflect to imaging assembly 550 as light beams 608a and 608b, respectively.

It is therefore necessary to process the images captured by imaging assembly 550 in order to remove unwanted light. In this embodiment unwanted light is caused by light beams 606a, 606b, 608a and 608b as a result of protrusions 594a and 594b, and ambient light bright spots 596a and 596b. To resolve pointer locations and remove the unwanted light, the interactive input system 520 uses an image frame processing method similar to that shown in FIG. 7. In this embodiment, however, image frame processing is carried out by a master controller (not shown) which processes captured image frames output by imaging assembly 550. For each image frame that has been captured, the master controller stores the captured image frame in a buffer. The master controller then subtracts the background image frame from the captured image frame to yield a difference image frame.

Once the difference image frame has been calculated, the master controller analyses the intensity value of each pixel in the difference image frame and groups neighboring pixels that have a similar intensity value. Approaches for detecting the coordinates and characteristics of one or more bright points in captured image frames corresponding to touch points are described in U.S. Patent Application Publication No. 2010/0079385, and assigned to SMART Technologies ULC of Calgary, Alberta, the content of which is incorporated herein by reference in its entirety.

Figure 16A:
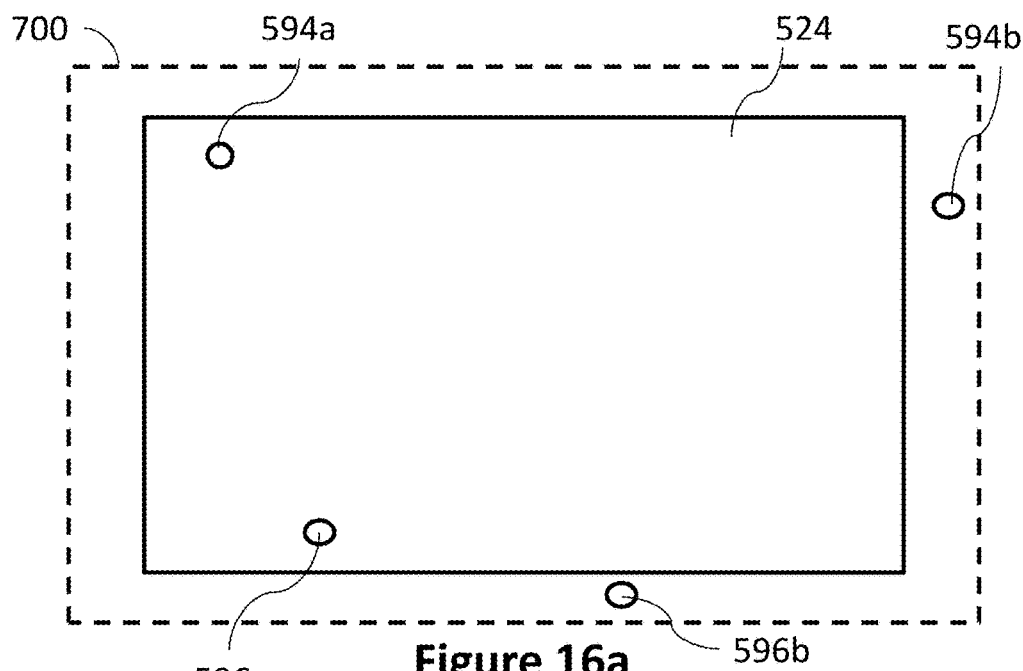
FIGS. 16a and 16b show a display surface of the interactive input system of FIG. 12 as seen by an image sensor of the interactive input system and the associated image frame acquired by the image sensor in which no pointers are imaged.
Figure 16B:
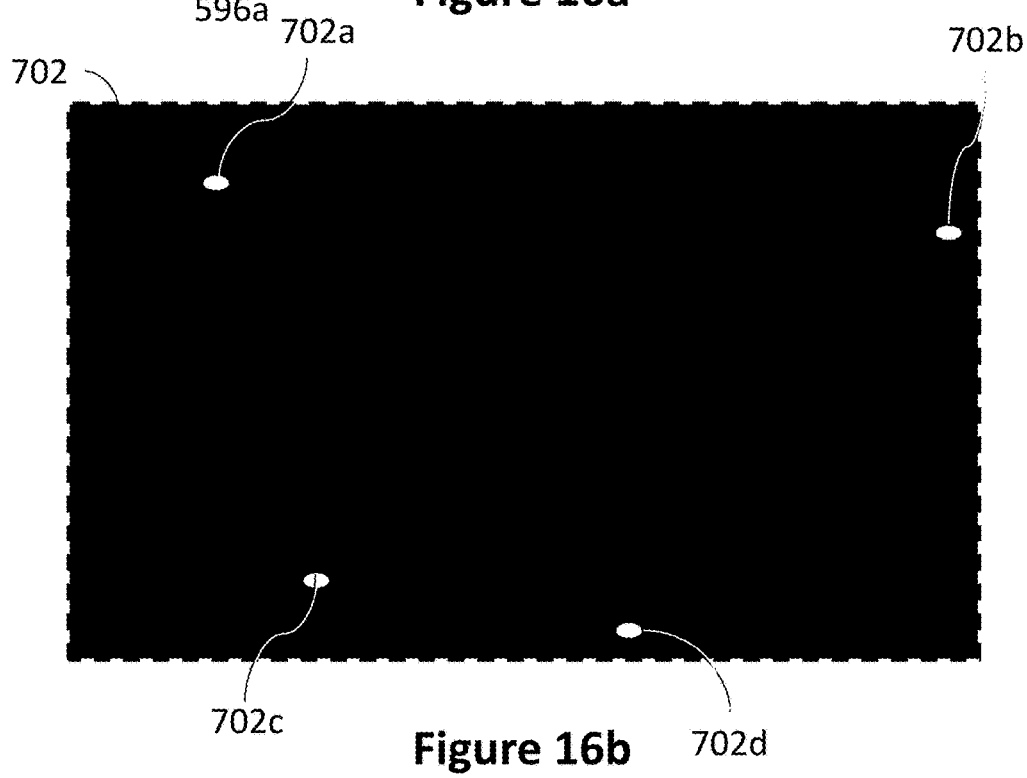

FIGS. 16a and 16b show an exemplary view 700 of display surface 524 and an associated image frame 702 captured by imaging assembly 550, respectively. As can be seen, view 700 shows the location of display surface 524 relative to protrusions 594a and 594b, and bright spots 596a and 596b. As can be seen, protrusion 594a and bright spot 596a are located within display surface 524 while protrusion 594b and bright spot 596b are located outside display surface 524. In image frame 702 all that is seen by imaging assembly 550 is a black background with four (4) bright areas 702a, 702b, 702c and 702d. Bright areas 702a and 702b are caused by protrusions 594a and 594b breaking light plane 560 and thus causing light to reflect towards the imaging assembly 550. Bright areas 702c and 702d are caused by light emitted from ambient light source 592 reflecting off display surface 524. In this embodiment, image frame 702 is identical to the background image.

Figure 17A:
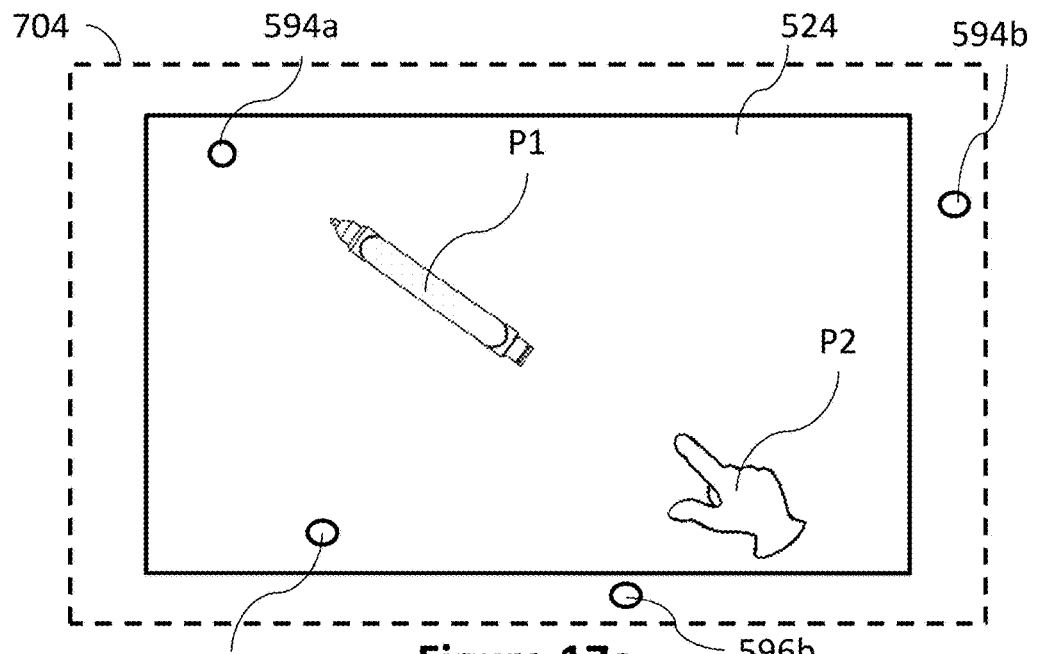
FIGS. 17a and 17b show the display surface of the interactive input system of FIG. 12 as seen by the image sensor of the interactive input system and the associated image frame acquired by the image sensor in which the two pointers of FIG. 12 are imaged.
Figure 17B:
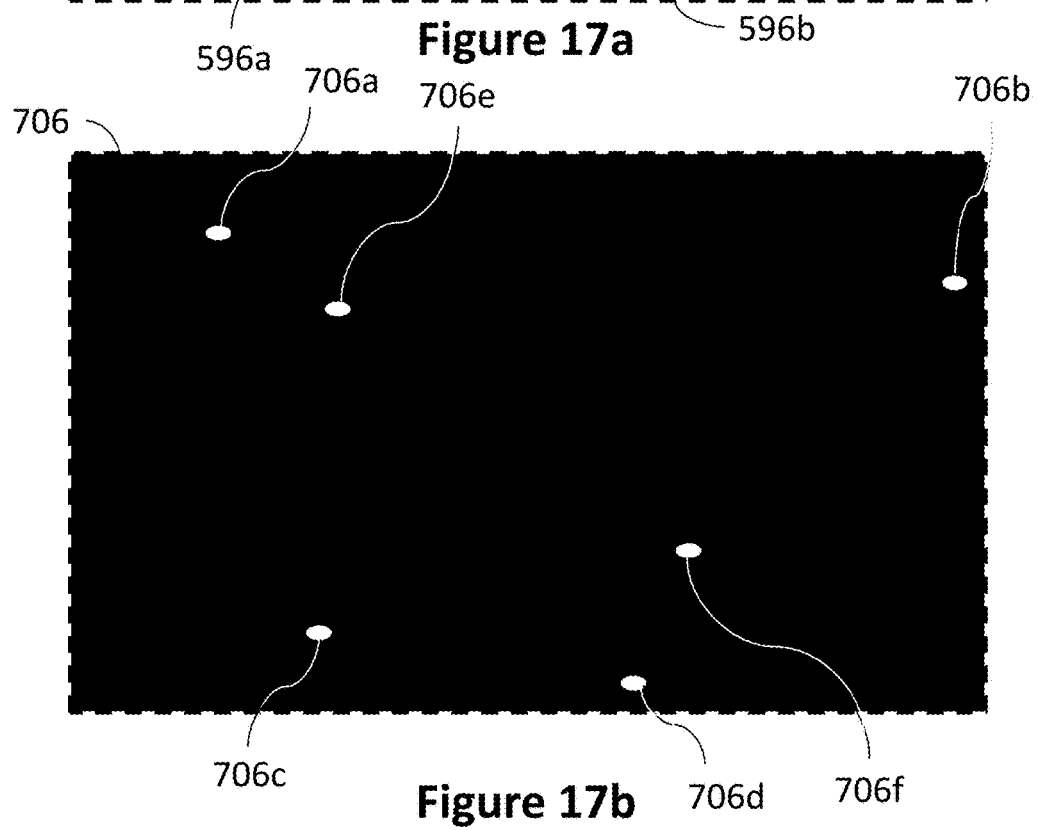

Turning now to FIGS. 17a and 17b, exemplary view 704 of display surface 524 and associated image frame 706 are shown, respectively. As can be seen, view 704 is the same as view 700, including protrusions 594a and 594b, and bright spots 596a and 596b. In addition to protrusions 594a, 594b and bright spots 596a, 596b, two pointers, P1 and P2, are also within view 704 of imaging assembly 550 and are in proximity with display surface 524. As will be appreciated, pointers P1 and P2 break light plane 560 and thus reflect IR light towards imaging assembly 550. In image frame 706 the imaging assembly 550 captures substantially the same information as image frame 702, with the addition of two additional bright areas 706a and 706b. As in image frame 702, bright areas 702a and 702b are caused by protrusions 594a and 594b breaking light plane 560 and thus causing light to reflect towards the imaging assembly 550, respectively. Bright areas 702c and 702d are caused by reflections off display surface 524 from ambient light source 592. As will be appreciated, bright area 706e is caused by pointer P1 breaking light plane 560 causing IR light to reflect towards and be captured by imaging assembly 550. Similarly, bright area 706f is caused by pointer P2 breaking light plane 560 causing IR light to reflect towards and be captured by imaging assembly 550.

Figure 18:
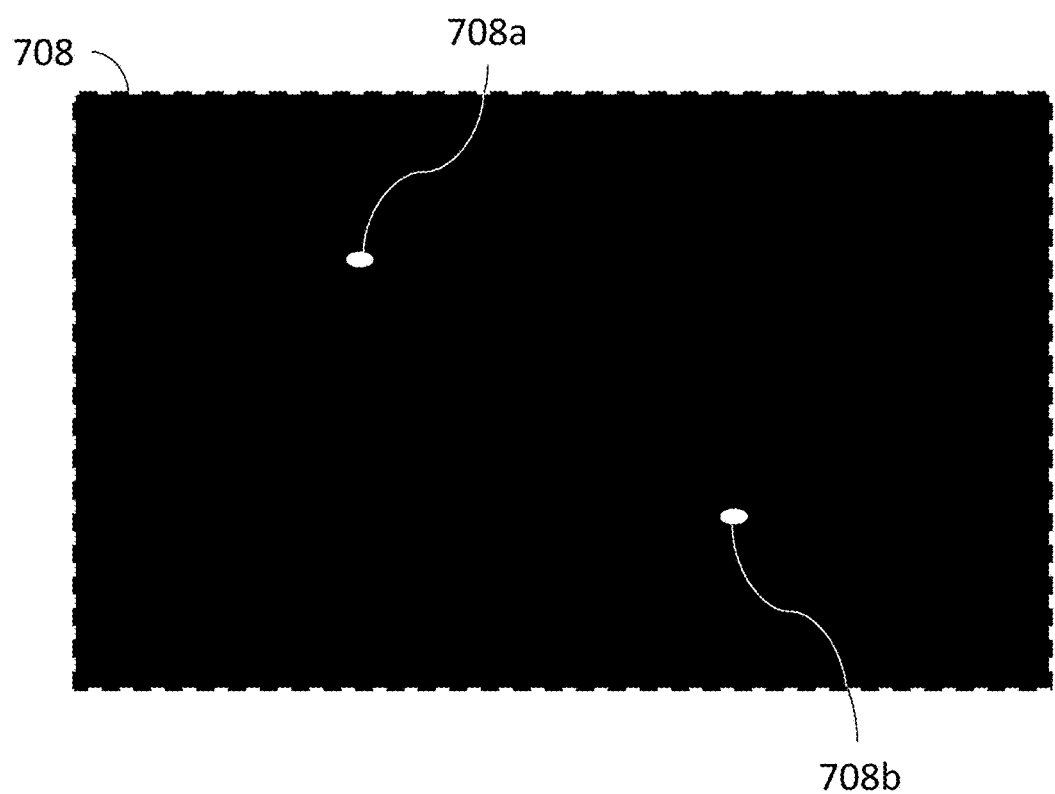
FIG. 18 is a difference image frame generated by subtracting the image frame of FIG. 16b from the image frame of FIG. 17b.

As long as the position of imaging assembly 550 and any bright areas present in the background and captured image frames remain stationary during image frame capture, when a difference image is created as described above, substantially all bright areas caused by unwanted light sources are removed leaving only a black background with bright areas caused by light reflected by passive pointers or light generated from active pointers. FIG. 18 shows difference image frame 708 created by subtracting image frame 702 from image frame 706. With the interactive input system 520 capturing images while stationary (not subject to any movement), all unwanted light sources are completely cancelled out in difference image frame 708. The only remaining bright areas in the difference image frame are bright areas 708a and 708b, caused by pointers P1 and P2 breaking light plane 560 and reflecting IR light towards and captured by imaging assembly 550.

When the position of the imaging assembly 550 relative to the display surface 524 suddenly changes, due to interference such as for example someone bumping into the overhead unit 526 or someone slamming a door causing vibration of the overhead unit 526, the position of the bright areas captured by imaging assembly 550 may change. This results in the determination of erroneous targets and false pointer locations.

Figure 19A:
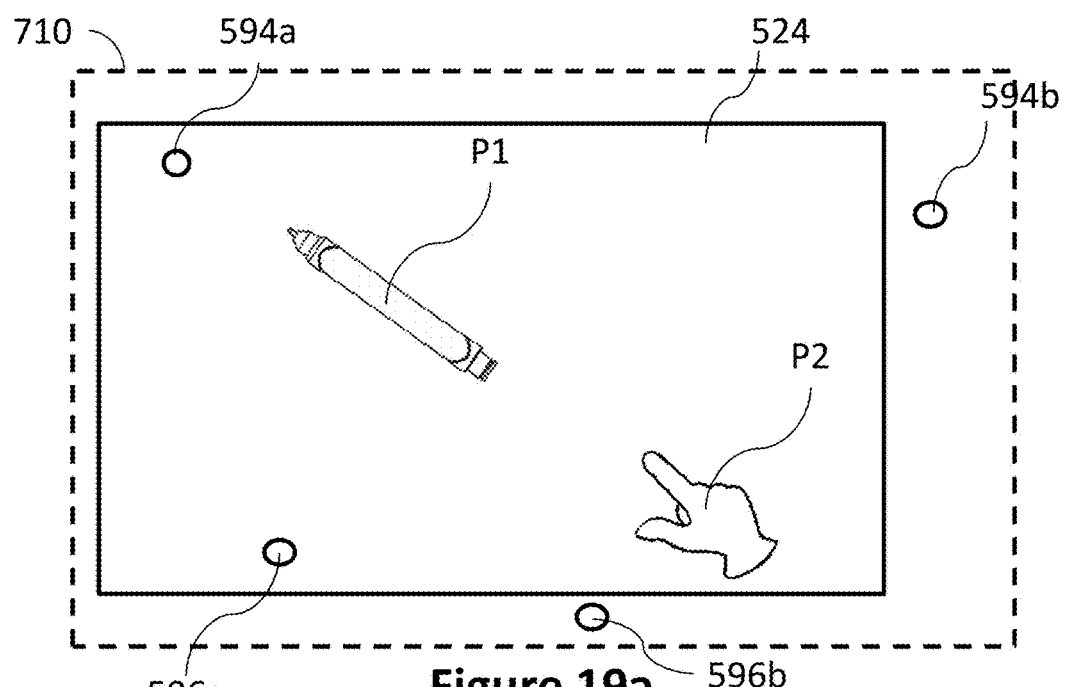
FIGS. 19a and 19b show the display surface of the interactive input system of FIG. 12 as seen by the image sensor of the interactive input system and the associated image frame acquired by the image sensor in which the two pointers of FIG. 12 are imaged during system displacement.
Figure 19B:
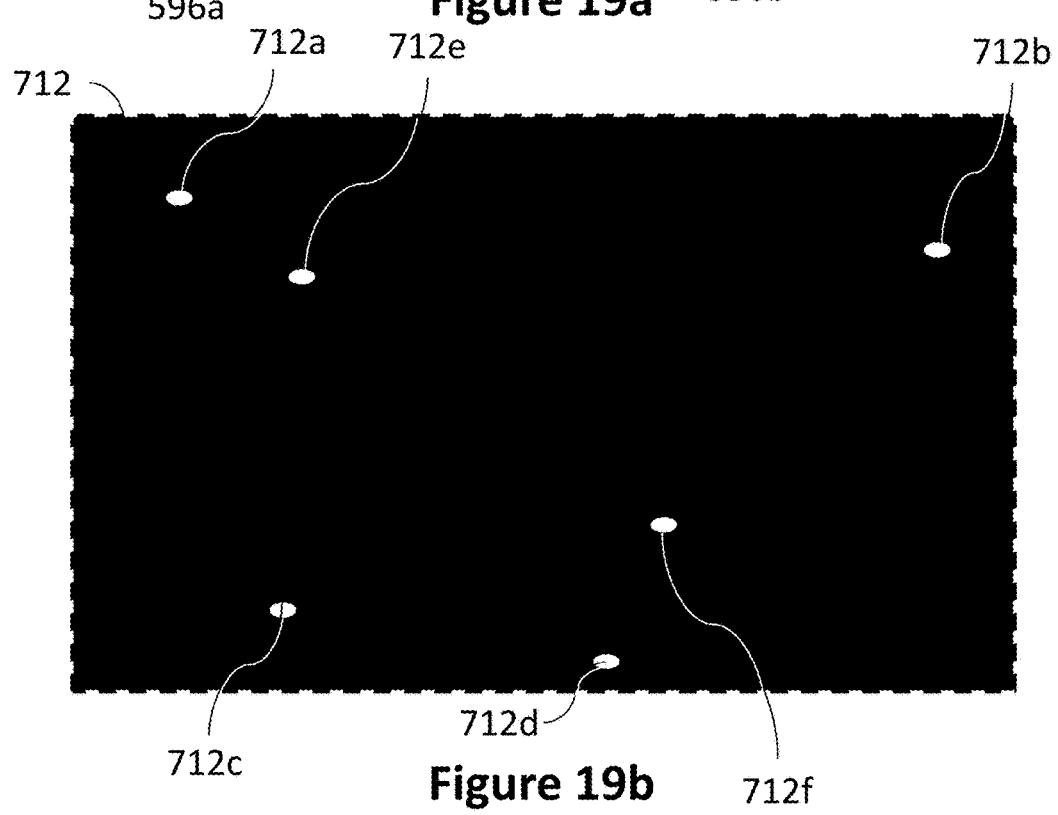

FIGS. 19a and 19b show an exemplary view 710 of display surface 524 and image frame 712, respectively, in the event overhead unit 526 is subject to sudden movement causing imaging assembly 550 and display surface 524 to displace relative to one another. In this embodiment, the positions of protrusions 594a, 594b, bright spots 596a, 596b and pointers P1, P2 relative to display surface 524 are the same as in view 704 but appear shifted to the left in view 710 due to the sudden movement. Image frame 712 corresponds to view 710 and shows the locations of bright areas 712a through 712f representing light captured from protrusions 594a, 594b, bright spots 596a, 596b and pointers P1, P2, respectively. As can be seen, the positions of bright areas 712a through 712f of image frame 712 appear to be shifted to the left compared to the positions of bright areas 706a through 706f of image frame 706.

Figure 20:
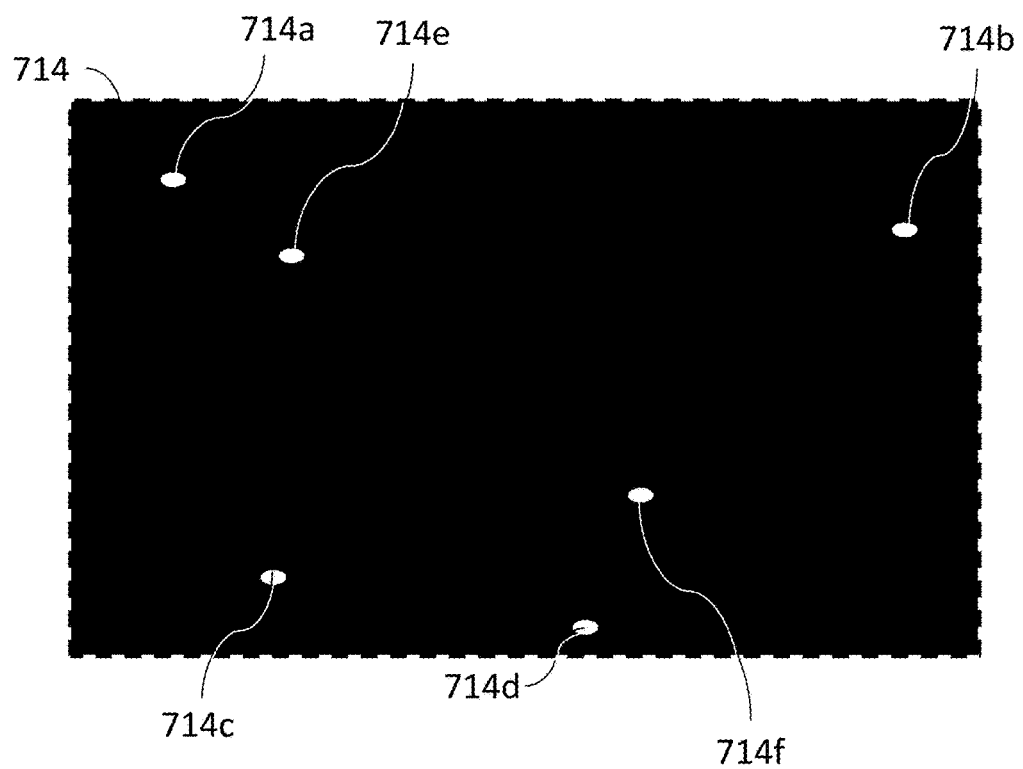
FIG. 20 is a difference image frame generated by subtracting the image frame of FIG. 16b from the image frame of FIG. 19b.

Such displacement illustrated in FIGS. 19a and 19b introduces problems when determining the number and location of pointers in contact with the display surface such as for example the creation of erroneous targets and determining incorrect pointer positions. FIG. 20 shows difference image frame 714 created by subtracting image frame 702 from image frame 712. With the system subject to displacement, while pointers P1 and P2, unwanted light sources caused by protrusions 594a and 594b, and bright spots 596a and 596b remain stationary, unwanted light sources fail to become cancelled out in difference image frame 714. All bright areas in image frame 712 are present in difference image frame 714 since the system displacement causes the bright areas 702a to 702d of background image frame 702 to not align with the bright areas 712a to 712f of image frame 712. As a result, the master controller will determine the input coordinates of each of the bright areas 714a to 714f causing several false target locations. The master controller will also continue to determine the coordinates of pointers P1 and P2, but due to the system displacement, the coordinates may be inaccurate.

To overcome the undesired effects caused by sudden system displacement, it is assumed that only the image sensor is displaced, that is, the display surface 524, background features caused by sources of unwanted light and pointers remain stationary. Background features are any features found in the background image frame that are sufficiently distinct (bright and having a sharp edge) and stationary. The displacement may be characterized by translation, rotation, scaling and perspective rotation. The change of position of any feature on an image frame due to image sensor displacement is calculated using a linear matrix manipulation. With sufficient and consistent background features in the background image frame and captured image frame, the background features are located in each of the image frames and the linear matrix is calculated. The linear matrix is used to calculate a distortion that is applied to either the background image frame or the captured image frame.

In this embodiment, background features are identified in background image frame 702 such as bright areas 702a, 702b, 702c and 702d. The locations of these background features in captured image frame 702 are identified and a linear matrix representing the positional differences of these background features is calculated. A distortion based on the above calculated linear matrix is then applied to the background image frame 702 before being subtracted from image frame 712 to create a difference image frame as described above. Alternatively a distortion can be applied to captured image frame 712 before creating the difference image frame. The distortion aligns background features in background image frame 702 with background features in captured image frame 712. This allows system 520 to generate a difference image frame that more closely resembles difference image frame 708 instead of difference image frame 714, thereby inhibiting spurious targets and inaccurate pointer locations from being determined.

Figure 21:
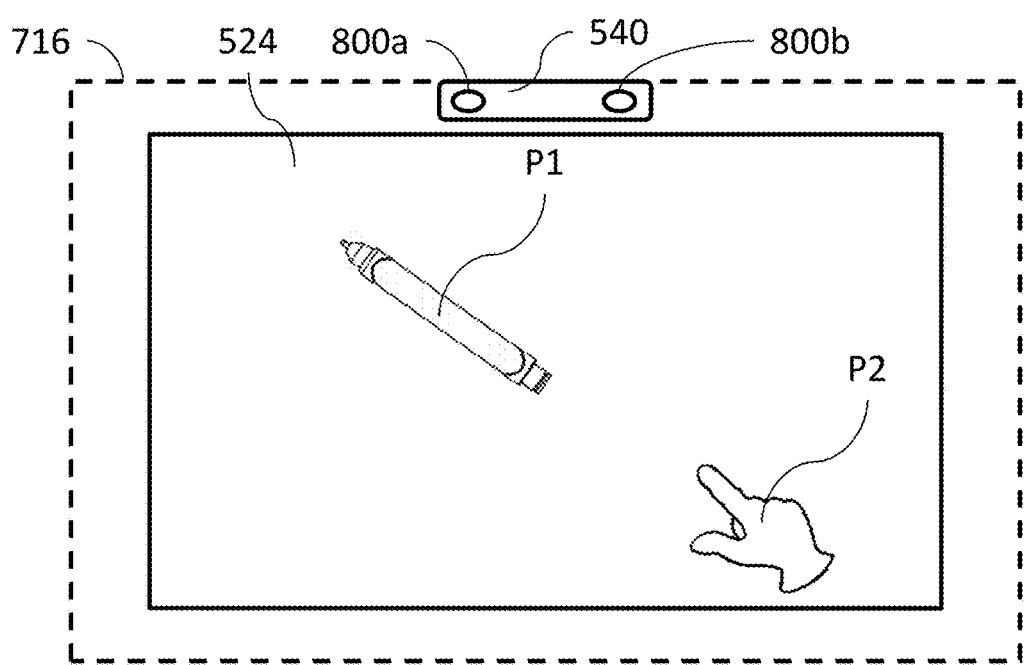
FIG. 21 shows the display surface of the interactive input system of FIG. 12 and a base assembly with incorporated background features as seen by the image sensor thereof.

In another embodiment, the interactive input system 520 further comprises dedicated background features as shown in view 716 of FIG. 21. In this embodiment, the dedicated background features are small light sources such as for example miniature LEDs 800a and 800b located on base assembly 540 and within the field of view of the imaging assembly 550. As will be appreciated, the dedicated background features may also be projected light areas created from a light source such as an infrared laser diode. The use of dedicated background features increases the ability of interactive input system 520 to compensate for displacement by including background features at a known position that are tuned to the optical filters and image sensor and not relying on naturally occurring background features that may not be present, stationary or numerous enough to allow for reliable background feature motion tracking and compensation.

Although the light curtain module is described above as emitting light generally continuously, those skilled in the art will appreciate that the light curtain module may pulse the emitted light such that it is in sequence with image frame capture.

While the above embodiments describe a displacement to the system or system components, it should be understood that the displacement is a sudden physical disturbance causing the position of the imaging devices to be sufficiently and temporarily or permanently displaced in a translational motion, rotational motion or both. This displacement causes the view of the imaging device to change.

Although the imaging assembly is described as being installed in the same unit as the projection unit, in another embodiment they may be installed in separate units. If the imaging assembly and projection unit are installed in two different units, it will be appreciated that these two devices may be located remotely from each other. For example, the imaging unit may project an image from the rear of the display surface, such as in well-known rear-projection devices, while the imaging assembly may view the display surface from the front. Alternatively the imaging assembly may be positioned behind the display surface with the projection unit so the imaging assembly views the back of the touch surface.

While the method of illuminating pointing devices brought into contact with the display surface is described as being a light curtain module, those skilled in the art will appreciated that any other means of illuminated touch surfaces may be used.

Other pointing devices that may be used include active pointing devices that emit light when brought into contact with a surface, or a light pointing device such as a laser pointer.

Although in embodiments described above an image processing method is described as calculating a difference VIP by subtracting a background VIP from a captured VIP, those skilled in the art will appreciate that other image processing methods may be used to generate a difference VIP, such as that described in U.S. Patent Application Publication No. 2012/0250936 to Holmgren entitled "Interactive Input System and Method" filed on Mar. 31, 2011 and assigned to SMART Technologies, ULC, the disclosure of which is herein incorporated by reference in its entirety.

Although embodiments have been described above with reference to the accompanying drawings, those of skill in the art will appreciate that variations and modifications may be made without departing from the scope thereof as defined by the appended claims.

What is claimed is:

1. An interactive input system, comprising:
   at least one imaging device configured to capture image frames of a region of interest comprising a background and at least one background feature, wherein the at least one background feature comprises at least one dedicated discrete light source; and
   a processing structure configured to:
      receive, from the at least one imaging device, imaging data based on the captured image frames;
      receive background vertical intensity profile (VIP) data;
      calculate a difference VIP based on the received background VIP data and the received imaging data;
      compare the captured image frames to determine whether the location of the at least one background feature in the captured image frames has changed signifying system displacement,
         wherein the comparing is partially based on the difference VIP; and
      based on the result of the comparing, modify captured image frames to compensate for the system displacement.

2. The interactive input system of claim 1, wherein the at least one imaging device is positioned above a display surface within the region of interest.

3. The interactive input system of claim 2, further comprising an illumination source providing a plane of illumination generally parallel to the display surface.

4. The interactive input system of claim 3, wherein at least one pointer brought into proximity with the background reflects illumination of the plane towards the at least one imaging device.

5. The interactive input system of claim 4, further comprising at least one background feature configured to reflect illumination of the plane towards the at least one imaging device.

6. The interactive input system of claim 1, wherein at least one of the image frames is captured in the event at least one pointer is brought into proximity of the background.

7. The interactive input system of claim 6, wherein at least one of the image frames is a background image frame captured in the event no pointers are within proximity of the background.

8. The interactive input system of claim 7, wherein the processing structure is further configured to calculate a distortion based on the change in location of the at least one background feature.

9. The interactive input system of claim 8, wherein the processing structure is further configured to apply the distortion to one of the background image frame and the image frame captured in the event at least one pointer is brought into proximity of the background.

10. The interactive input system of claim 9, wherein the processing structure is configured to generate a difference image frame by subtracting the background image frame from the image frame captured in the event at least one pointer is brought into proximity of the background.

11. The interactive input system of claim 10, wherein the processing structure is further configured to identify the presence of the at least one pointer in the difference image frame.

12. The interactive input system of claim 11, wherein the processing structure is further configured to calculate the location of the at least one pointer.

13. The interactive input system of claim 1, wherein the background is at least one bezel at least partially surrounding a display surface within the region of interest.

14. The interactive input system of claim 13, wherein the at least one dedicated discrete light source is on the at least one bezel.

15. The interactive input system of claim 13, wherein the at least one background feature comprises a plurality of dedicated discrete light sources at spaced locations on the at least one bezel.

16. The interactive input system of claim 1, wherein the at least one background feature comprises a plurality of dedicated discrete light sources at spaced locations within the region of interest.

17. The interactive input system of claim 1, wherein the processing structure is further configured to: crop the background VIP data before calculating the difference VIP.

18. The interactive input system of claim 1, wherein the processing structure is further configured to: calculate difference VIP by subtracting the background VIP data from VIP data for the captured image frames.

19. A method of determining displacement of an interactive input system, the method comprising:
capturing image frames of a region of interest comprising a background and at least one background feature using at least one imaging device, wherein the at least one background feature comprises at least one dedicated discrete light source;
receiving vertical intensity profile (VIP) background data;
calculating a difference VIP based on the VIP background data and the captured image frames;
comparing the captured image frames, based at least in part on the different VIP, to determine whether the location of the at least one background feature in the captured image frames has changed signifying system displacement, and
based on the result of the comparing, modifying the captured image frames to compensate for the system displacement.

20. The method of claim 19, wherein at least one of the image frames is captured in the event at least one pointer is brought into proximity of the background.

21. The method of claim 20, wherein at least one of the image frames is a background image frame captured in the event no pointers are within proximity of the background.

22. The method of claim 21, further comprising, calculating a distortion based on the change in location of the at least one background feature.

23. The method of claim 22, further comprising, applying the distortion to one of the background image frame and the image frame captured in the event at least one pointer is brought into proximity of the background.

24. The method of claim 22, further comprising, generating a difference image frame by subtracting the background image frame from the image frame captured in the event at least one pointer is brought into proximity of the background.

25. The method of claim 24, further comprising, identifying the presence of the at least one pointer in the difference image frame.

26. The method of claim 25, further comprising, calculating the location of the at least one pointer.

27. A non-transitory computer readable medium embodying a computer program comprising instructions, which when executed by a computer, causes the computer to carry out a method, comprising:
receiving vertical intensity profile (VIP) background data;
comparing captured image frames of a region of interest comprising a background and at least one background feature to determine whether the location of the at least one background feature appearing in the captured image frames has changed signifying system displacement, wherein the at least one background feature comprises at least one dedicated discrete light source, wherein the comparing includes calculating a difference VIP based on the VIP background data and the captured image frames; and
based on the result of the comparing, modifying the captured image frames to compensate for the system displacement.

* * * * *